United States Patent
Chae et al.

(10) Patent No.: US 10,135,502 B2
(45) Date of Patent: Nov. 20, 2018

(54) METHOD AND APPARATUS FOR HIERARCHICALLY COOPERATIVE V-MIMO IN WIRELESS COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Hyukjin Chae, Seoul (KR); Byoung-Yoon Min, Seoul (KR); Kiyeon Kim, Seoul (KR); Dong Ku Kim, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/039,373

(22) PCT Filed: Dec. 5, 2014

(86) PCT No.: PCT/KR2014/011927
§ 371 (c)(1),
(2) Date: May 25, 2016

(87) PCT Pub. No.: WO2015/084104
PCT Pub. Date: Jun. 11, 2015

(65) Prior Publication Data
US 2017/0170881 A1    Jun. 15, 2017

Related U.S. Application Data

(60) Provisional application No. 61/912,531, filed on Dec. 5, 2013.

(51) Int. Cl.
*H04B 7/02* (2018.01)
*H04W 4/00* (2018.01)
(Continued)

(52) U.S. Cl.
CPC .......... *H04B 7/0413* (2013.01); *H04B 7/024* (2013.01); *H04B 7/026* (2013.01); *H04B 7/0404* (2013.01);
(Continued)

(58) Field of Classification Search
CPC .... H04B 7/024; H04B 7/0626; H04B 7/0452; H04B 7/0632; H04B 7/0417;
(Continued)

(56) References Cited

U.S. PATENT DOCUMENTS

2009/0010149 A1\* 1/2009 Lee .................. H04B 7/068
370/208
2010/0106797 A1 4/2010 Nagaraja
(Continued)

*Primary Examiner* — Sam K Ahn
*Assistant Examiner* — Sarah Hassan
(74) *Attorney, Agent, or Firm* — Birch, Stewart, Kolasch & Birch, LLP

(57) ABSTRACT

A method is provided for determining, by a base station, a Virtual-Multiple-Input Multiple-Output (V-MIMO) cluster in a wireless communication system. The base station determines a transmission efficiency of a temporary cluster and selects one or more entry candidate nodes contained in the temporary cluster. The base station determines an entry transmission efficiency. The entry transmission efficiency is a transmission efficiency when the entry candidate node enters a V-MIMO unit cluster. The base station determines whether to make the entry candidate node enter the V-MIMO unit cluster by comparing the entry transmission efficiency with the transmission efficiency of the temporary cluster.

11 Claims, 14 Drawing Sheets

(51) Int. Cl.
| | |
|---|---|
| *H04B 7/0413* | (2017.01) |
| *H04B 7/06* | (2006.01) |
| *H04B 7/024* | (2017.01) |
| *H04N 19/184* | (2014.01) |
| *H04B 7/026* | (2017.01) |
| *H04B 7/0404* | (2017.01) |
| *H04B 7/0408* | (2017.01) |
| *H04W 52/42* | (2009.01) |

(52) U.S. Cl.
CPC ......... *H04B 7/0408* (2013.01); *H04B 7/0632* (2013.01); *H04N 19/184* (2014.11); *H04W 52/42* (2013.01)

(58) Field of Classification Search
CPC .. H04B 7/0639; H04B 7/0634; H04B 7/0413; H04B 7/0404; H04B 7/0469; H04B 17/00; H04B 17/15; H04B 17/309; H04B 7/06; H04B 7/061
USPC .......................................... 375/267; 370/328
See application file for complete search history.

(56) References Cited

U.S. PATENT DOCUMENTS

| | | | |
|---|---|---|---|
| 2012/0231739 A1* | 9/2012 | Chen | ..................... H04B 7/026 455/41.2 |
| 2013/0029680 A1 | 1/2013 | Park et al. | |
| 2013/0279613 A1 | 10/2013 | Seo et al. | |

\* cited by examiner

FIG. 5
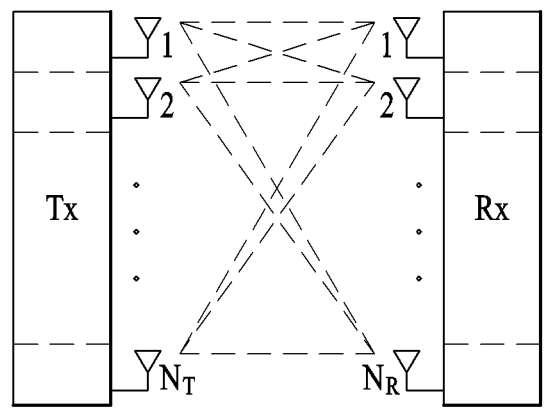
(a)
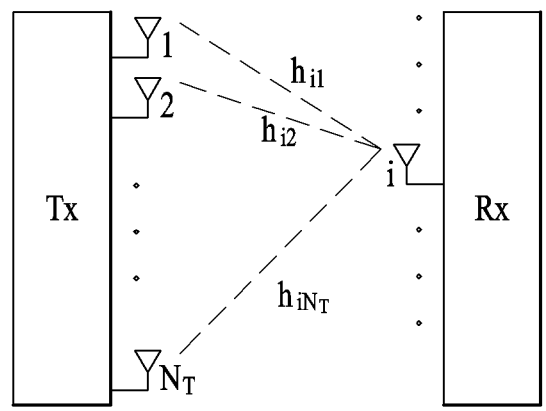
(b)

METHOD AND APPARATUS FOR HIERARCHICALLY COOPERATIVE V-MIMO IN WIRELESS COMMUNICATION SYSTEM

CROSS REFERENCE TO RELATED APPLICATIONS

This application is the National Phase of PCT/KR2014/011927 filed on Dec. 5, 2014, which claims priority under 35 U.S.C. 119(e) to U.S. Provisional Application No. 61/912,531 filed on Dec. 5, 2013, all of which are hereby expressly incorporated by reference into the present application.

TECHNICAL FIELD

The present invention relates to a wireless communication system, and more particularly, to a method of performing Virtual-Multiple-Input Multiple-Output (V-MIMO) of a hierarchical cooperative structure and an apparatus therefor.

BACKGROUND ART

Wireless communication systems are widely deployed to provide various kinds of communication service such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE OF THE INVENTION

Technical Task

A technical task of the present invention is to provide a method of performing V-MIMO of a hierarchical cooperative structure.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of determining a V-MIMO (Virtual Multiple Input and Multiple Output) cluster, which is determined by a user equipment in a wireless communication system, includes the steps of selecting one or more entry candidate nodes included in a temporary cluster, determining transmission efficiency according to entry of the entry candidate node, and determining whether to make the entry candidate node enter a V-MIMO unit cluster based on the determined transmission efficiency. In this case, whether to make the entry candidate node enter the V-MIMO unit cluster can be determined by comparing the determined transmission efficiency and transmission efficiency prior to the entry of the entry candidate node with each other.

To further achieve these and other advantages and in accordance with the purpose of the present invention, according to a second technical aspect of the present invention, a device determining a V-MIMO (Virtual Multiple Input and Multiple Output) cluster in a wireless communication system can include a receive module and a processor, the processor configured to select one or more entry candidate nodes included in a temporary cluster, the processor configured to determine transmission efficiency according to entry of the entry candidate node, the processor configured to determine whether to make the entry candidate node enter a V-MIMO unit cluster based on the determined transmission efficiency. In this case, whether to make the entry candidate node enter the V-MIMO unit cluster can be determined by comparing the determined transmission efficiency and transmission efficiency prior to the entry of the entry candidate node with each other.

The first technical aspect and the second technical aspect can include all or a part of the followings.

The transmission efficiency according to the entry of the entry candidate node can be determined based on a channel use amount of a cluster including the one or more entry candidate nodes and a transfer rate at the time of performing V-MIMO transmission.

The transmission efficiency can be determined by an equation in the following $$\frac{R(M)}{\beta_{LDS}(M)}.$$

In this case, the R(M) may correspond to a transfer rate of a cluster M at the time of performing V-MIMO transmission and the $\beta_{LDS}(M)$ may correspond to a channel use amount of the cluster M.

The $\beta_{LDS}(M)$ can be determined by an equation in the following.

$$\beta_{LDS}(M) = \sum_{\forall i \in M} \beta_{LDS}(M(l))$$

$$\beta_{LDS}(M(l)) = \max_{\forall l, k \in M, l \neq k} \frac{T_l}{\log\left(1 + \frac{\eta_{lk}|g_{lk}^2|P_{TX}}{\sigma^2 + \bar{p}^l(M)}\right)}.$$

In this case, the $\eta_{lk}$ may correspond to a long term channel gain, the $g_{lk}$ may correspond to a small scale fading value between an $l^{th}$ transmission node and a $k^{th}$ transmission node, the $n_i$ may correspond to a noise signal of $\sigma^2$ power, the $T_l$ may correspond to a transmission data amount of the $l^{th}$ transmission node, the $\bar{p}^l(M)$ may correspond to an average interference amount received from a neighboring random node set by the cluster M, and the TX may correspond to transmit power.

The channel use amount may correspond to a resource amount used for local data sharing in a unit cluster.

If determination on whether to make the entry candidate node enter the V-MIMO unit cluster is made by a representative node, the determination on whether to make the entry candidate node enter the V-MIMO unit cluster can be broadcasted.

If the one or more entry candidate nodes are determined to enter the V-MIMO unit cluster, the V-MIMO unit cluster can be updated.

The one or more entry candidate nodes can be excluded from a residual node set of the temporary cluster.

Determination on whether to make the entry candidate node enter the V-MIMO unit cluster can be repeated until there is no node in the residual node set.

The V-MIMO unit cluster can aggregate with a different V-MIMO unit cluster depending on transmission efficiency.

Whether to aggregate the V-MIMO unit cluster with the different V-MIMO unit cluster can be determined by comparing transmission efficiency of the V-MIMO unit cluster and transmission efficiency at the time of aggregating with the different V-MIMO unit cluster with each other.

Whether to aggregate the V-MIMO unit cluster with a different V-MIMO unit cluster can be determined by an equation in the following $$\max\left[\frac{R(S^{[q]})}{\beta_{Used}^{[q]}(S^{[q]})}, \frac{R(S^{[q]} \cup L^{[q]})}{\beta_{Used}^{[q]}(S^{[q]}) + \beta_{New}^{[q]}(S^{[q]} \cup L^{[q]})}\right].$$

In this case, $R(S^{[q]})$ the may correspond to a transfer rate of the V-MIMO unit cluster, the $R(S^{[q]} \cup L^{[q]})$ may correspond to a transfer rate at the time of aggregating the V-MIMO unit cluster with the different V-MIMO unit cluster, the $\beta_{Used}^{[q]}(S^{[q]})$ may correspond to a channel use amount of a V-MIMO unit cluster, and the $\beta_{New}^{[q]}(S^{[q]} \cup L^{[q]})$ may correspond to a channel use amount occurring at the time of aggregating the V-MIMO unit cluster with the different V-MIMO unit cluster.

Advantageous Effects

According to the present invention, it is able to determine a cluster/aggregated clusters capable of obtaining maximum efficiency when a V-MIMO scheme is applied in a hierarchical cooperative structure.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for explaining MIMO;

BEST MODE

Mode for Invention

Figure 1:
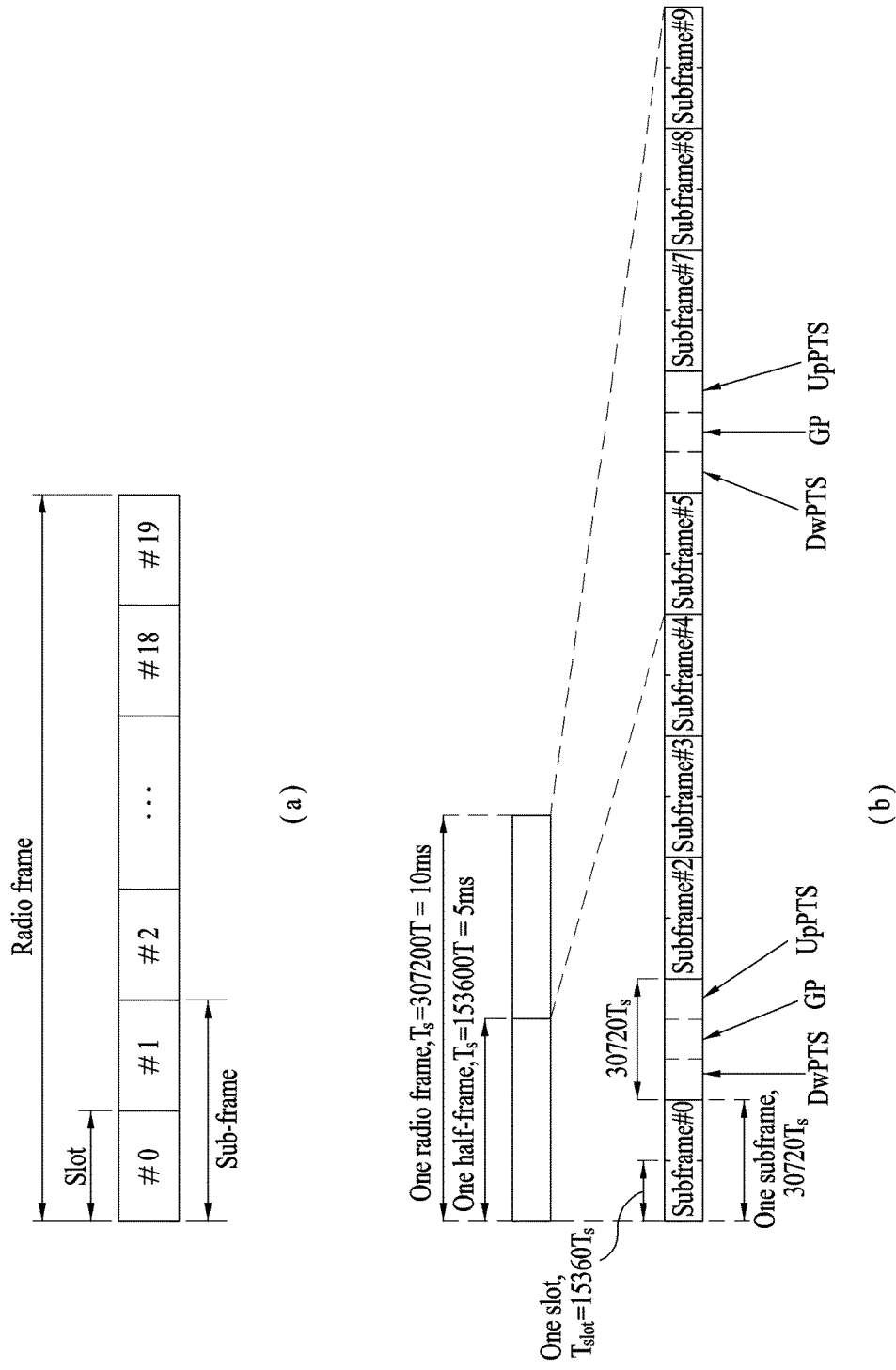
FIG. 1 is a diagram for a structure of a radio frame.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a base station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

A name of a cell described in the following is applied to a transceiving point such as a base station (eNB), a sector, a remote radio head (RRH), a relay, or the like, and may be used as an inclusive terminology for distinguishing a component carrier at a specific transceiving point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LIE is a part of Evolved UMTS (E-UMTS) using E-UTRA. 3GPP LIE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

LTE/LTE-A Resource Structure/Channel

A downlink radio frame structure will now be described with reference to FIG. 1.

In a cellular OFDM radio packet communication system, uplink/downlink data packet transmission is performed subframe by subframe. A subframe is defined as a predetermined time interval including a plurality of OFDM symbols. 3GPP LTE standard supports type 1 radio frame structure applicable to frequency division duplex (FDD) and type 2 radio frame structure applicable to time division duplex (TDD).

FIG. 1(a) shows the type 1 radio frame structure. A downlink radio frame is divided into 10 subframes. Each subframe is further divided into two slots in the time domain. A unit time during which one subframe is transmitted is defined as Transmission Time Interval (TTI). For example, one subframe may be 1 ms in duration and one slot may be 0.5 ms in duration. A slot may include a plurality of OFDM symbols in the time domain and include a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot may be changed according to the configuration of a Cyclic Prefix (CP). There are an extended CP and a normal CP. For example, the number of OFDM symbols included in one slot may be seven in case of a normal CP. In case of an extended CP, the length of one OFDM symbol is increased and thus the number of OFDM symbols included in one slot is less than that in case of a normal CP. In case of the extended CP, for example, the number of OFDM symbols included in one slot may be six. If a channel state is instable as is the case when a UE moves fast, the extended CP may be used in order to further reduce inter-symbol interference.

In case of a normal CP, since one slot includes seven OFDM symbols, one subframe includes 14 OFDM symbols. The first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. DwPTS is used to perform initial cell search, synchronization, or channel estimation. UpPTS is used to perform channel estimation of a base station and uplink transmission synchronization of a UE. The guard interval (GP) is located between an uplink and a downlink so as to remove interference generated in the uplink due to multi-path delay of a downlink signal. One subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
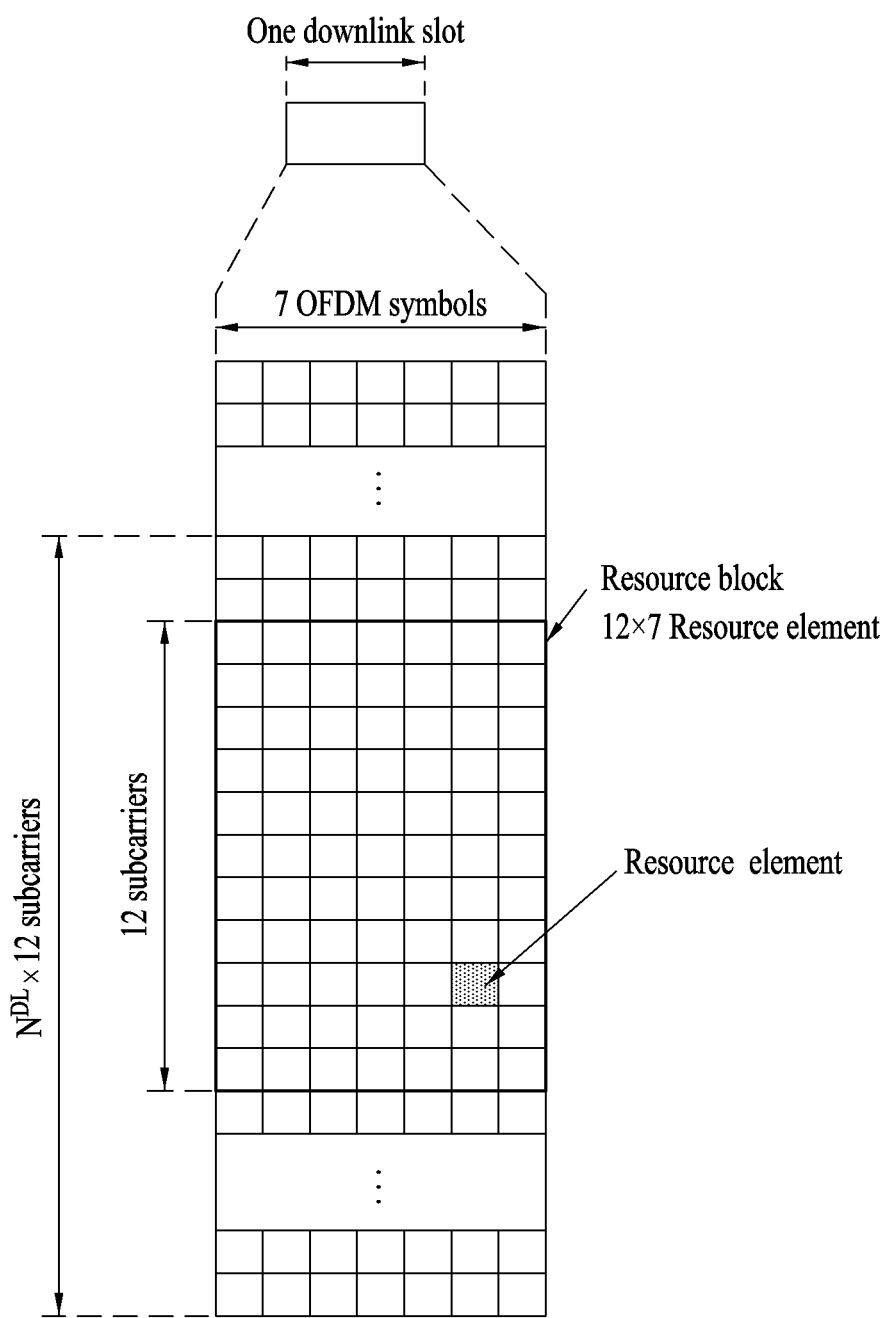
FIG. 2 is a diagram for a resource grid in a downlink slot.

FIG. 2 is a diagram showing a resource grid in a downlink slot. Although one downlink slot includes seven OFDM symbols in the time domain and one RB includes 12 subcarriers in the frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
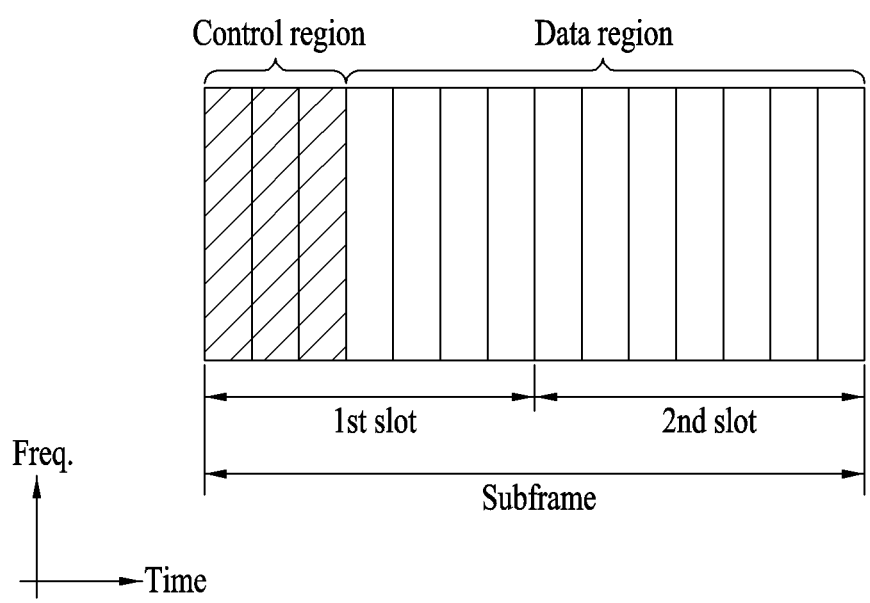
FIG. 3 is a diagram for a structure of a downlink subframe.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
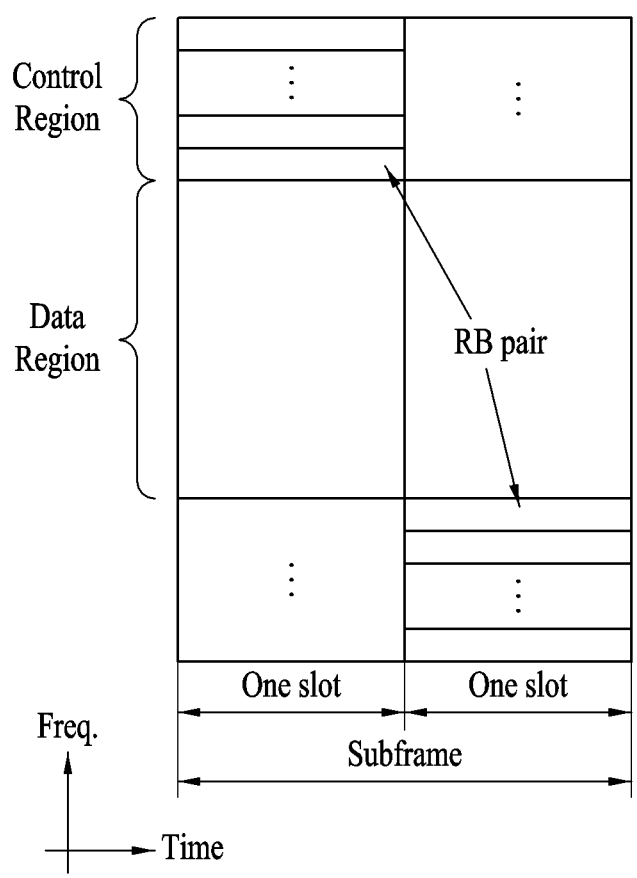
FIG. 4 is a diagram for a structure of an uplink subframe.

FIG. 4 is a diagram showing the structure of an uplink frame. The uplink subframe may be divided into a control region and a data region in a frequency region. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is frequency-hopped at a slot edge.

FIG. 5 is a schematic view illustrating a wireless communication system provided with multiple antennas.

As shown in FIG. 5(a), if the number of transmitting antennas increases to $N_T$ and the number of receiving antennas increases to $N_R$, channel transmission capacity increases theoretically in proportion to the number of antennas unlike that a plurality of antennas are used in only a transmitter or receiver. Accordingly, it is possible to improve a transmission rate and remarkably improve frequency efficiency. A transmission rate based on increase of channel transmission capacity may increase theoretically as much as a value obtained by multiplying a maximum transmission rate $R_0$, which corresponds to a case where a single antenna is used, by an increase rate $R_i$, as follows.

$$R_i = \min(N_T, N_R) \quad \text{[Equation 1]}$$

For example, in a MIMO communication system that uses four transmitting antennas and four receiving antennas, a transmission rate theoretically four times greater than that of a single antenna system may be obtained.

A communication method in a MIMO system will be described in more detail with reference to mathematical modeling. In the MIMO system, it is assumed that $N_T$ transmitting antennas and $N_R$ receiving antennas exist.

First of all, a transmitting signal will be described. If there exist $N_T$ transmitting antennas, the number of maximum transmission information is $N_T$. The transmission information may be expressed as follows.

$$s = [s_1, s_2, \ldots, s_{N_T}]^T \quad \text{[Equation 2]}$$

Different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{s}$ may be expressed as follows using a diagonal matrix P.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

It is considered that a weight matrix W is applied to the information vector $\hat{s}$ of which transmission power is controlled, so as to obtain NT transmitting signals $x_1, x_2, \ldots, x_{N_T}$. In this case, the weight matrix W serves to properly distribute the transmission information to each antenna in accordance with the transmission channel status. Such transmitting signals $x_1, x_2, \ldots, x_{N_T}$ may be expressed as follows using a vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = Wps \quad \text{[Equation 5]}$$

In this case, $W_{ij}$ means a weight value between the ith transmitting antenna and the jth information. W may be referred to as a precoding matrix.

If there exist NR receiving antennas, receiving signals $y_1, y_2, \ldots, y_{N_R}$ of the respective antennas may be expressed by a vector as follows.

$$y = [y_1, y_2, \ldots, y_{N_R}]^T \quad \text{[Equation 6]}$$

In case of channel modeling in the MIMO communication system, channels may be classified depending on indexes of transmitting and receiving antennas. In this case, a channel that passes from the jth transmitting antenna to the ith receiving antenna will be expressed as $h_{ij}$. It is noted that index of the receiving antenna is prior to index of the transmitting antenna in index of $h_{ij}$.

FIG. 5(b) illustrates channels from $N_T$ transmitting antennas from the receiving antenna i. Several channels may be grouped into one and then may be expressed by a vector type or a matrix type. As shown in FIG. 5(b), the channels from $N_T$ transmitting antennas to the ith receiving antenna may be expressed as follows.

$$h_i^T = [h_{i1}, h_{i2}, \ldots, h_{iN_T}] \quad \text{[Equation 7]}$$

Accordingly, all channels from $N_T$ transmitting antennas to $N_R$ receiving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \qquad \text{[Equation 8]}$$

Additive white Gaussian noise (AWGN) is actually added to the channels after the above channel matrix H. AWGN $n_1$, $n_2, \ldots, n_{N_R}$ added to each of the NR receiving antennas may be expressed as follows.

$$n = [n_1, n_2, \ldots n_{N_R}]^T \qquad \text{[Equation 9]}$$

The receiving signals obtained using the above equation modeling may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

In the mean time, the number of rows and columns of the channel matrix H indicating the channel status is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H may be expressed by $N_R \times N_T$ matrix.

A rank of the matrix is defined by a minimum number of the number of rows and the number of columns, which are independent from each other. Therefore, the rank of the matrix cannot have a value greater than the number of rows or the number of columns. Rank (rank(H)) of the channel matrix H may be limited as follows.

$$\text{rank}(H) \leq \min(N_T, N_R) \qquad \text{[Equation 11]}$$

The rank may also be defined by the number of eigen values not 0 when eigen value decomposition is performed for the matrix. Similarly, the rank may be defined by the number of singular values not 0 when singular value decomposition (SVD) is performed for the matrix. Accordingly, in the channel matrix, the rank may physically mean a maximum number of columns or rows that can transmit different kinds of information from a given channel.

V-MIMO Scheme of Hierarchical Cooperative Structure

Meanwhile, V-MIMO (Virtual Multiple Input and Multiple Output) was discussed in 'Virtual-MIMO Transmission and Feedback for Wireless Ad Hoc Networks, IEEE Journal on Selected Areas in Communications (2013), Sungyoon Cho, Kaibin Huang, Byoung-Yoon Min and Dong Ku Kim'. And, study on a hierarchical cooperative scheme was initially performed in 'Hierarchical cooperation achieves optimal capacity scaling in ad hoc networks, IEEE Trans. Inf. Theory, vol. 53, no. 10, pp. 3549-3572, October 2007, A. Ozgur, O. Leveque and D. N. C. Tse'. The study has found that as a step of the HC is getting infinite, a transfer rate is approximately and linearly increasing through asymptotic analysis. Yet, the study has a restriction that a channel used for sharing and transmitting data is not considered and a legacy study on V-MIMO did not consider a cluster configuration and multiple clusters. Although the number of nodes constructing a cluster increases, it is unable to guarantee the increase of transmission and reception efficiency. In particular, in case of using V-MIMO scheme in multiple clusters, it is also important to select an efficient local data sharing (LDS) scheme. Hence, it is necessary to perform a study on applying a hierarchical cooperative structure to V-MIMO and a study on V-MIMO for configuring a cluster as well. Hence, methods for applying a hierarchical cooperative structure to V-MIMO according to embodiments of the present invention are described in the following. Specifically, a temporary configuration method, a method of configuring a V-MIMO cluster, an algorithm for determining the optimized number of nodes constructing a cluster, an algorithm for determining an efficient LDS scheme in multiple clusters, an algorithm for transmitting hierarchical cooperative structure V-MIMO, etc. are explained in the following. Although the following description of the present invention basically explains a case that a pair of a transmitter and a receiver corresponds to one-to-one, the present invention can also be applied to a case of one-to-many or a case of many-to-one. For example, the present invention can also be applied to a case that a UE performs cooperative transmission and a receiver corresponds to a base station. Or, the present invention can also be applied to a case that a base station performs transmission and a receiver corresponds to a plurality of UEs.

Figure 6:
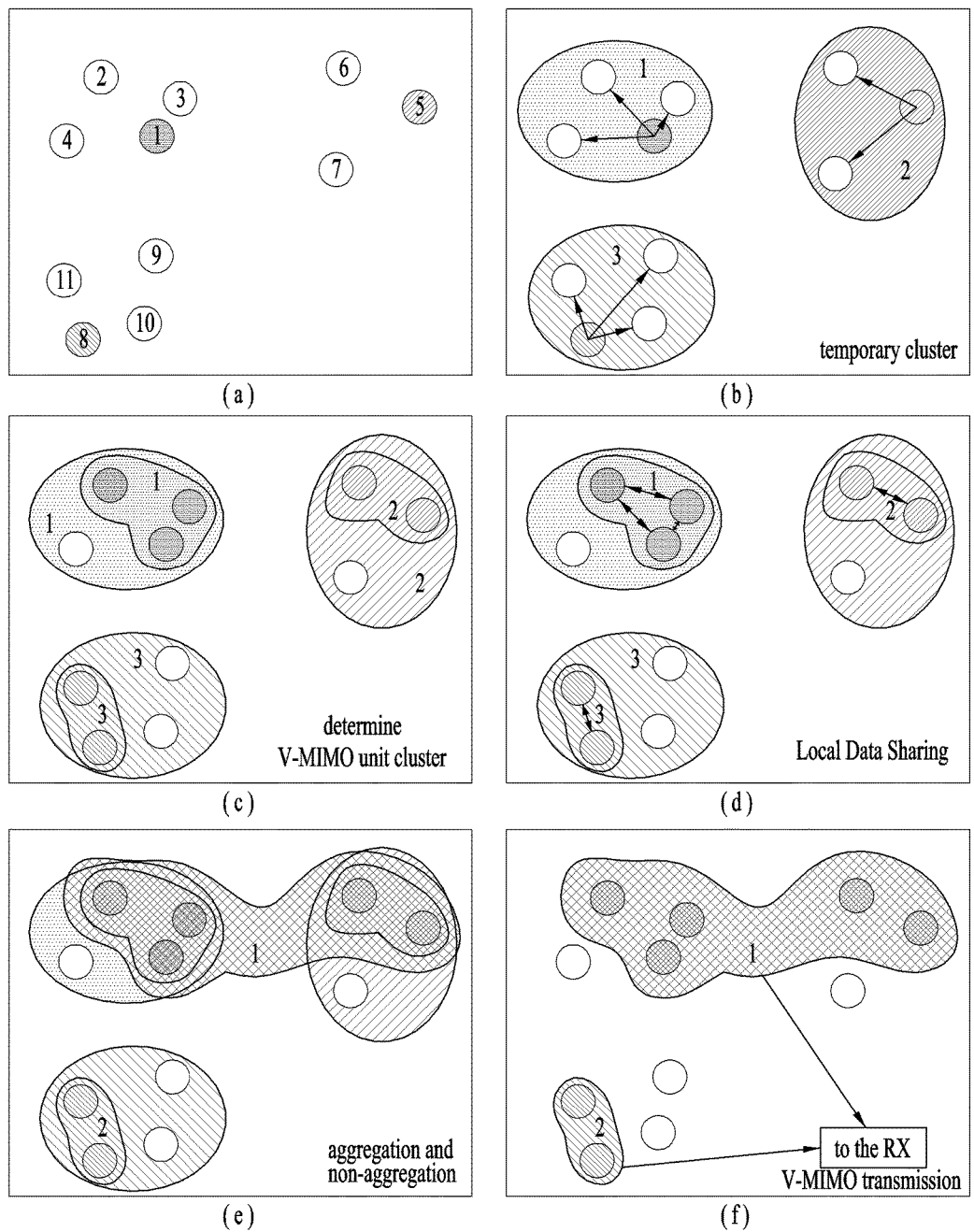
FIG. 6 is a diagram for a V-MIMO scheme of a hierarchical cooperative structure according to embodiment of the present invention.

FIG. 6 is a diagram for a V-MIMO scheme of a hierarchical cooperative structure according to embodiment of the present invention. The number of nodes, the number of clusters, formation, and the like shown in FIG. 6 are just examples.

As shown in FIG. 6 (b), 11 nodes shown in FIG. 6 (a) form 3 temporary clusters. As shown in FIG. 6 (c), each of the temporary clusters determines a V-MIMO unit cluster (each temporary cluster includes a shadow node) according to a method of determining V-MIMO cluster. Referring to FIG. 6 (b), LDS is performed in each of the V-MIMO unit clusters. Subsequently, as shown in FIG. 6 (e), it may be able to determine whether to aggregate V-MIMO unit clusters with each other or not. If it is determined to aggregate V-MIMO unit clusters with each other, as shown in FIG. 6 (f), V-MIMO transmission can be performed after the V-MIMO unit clusters are aggregated with each other.

Figure 7:
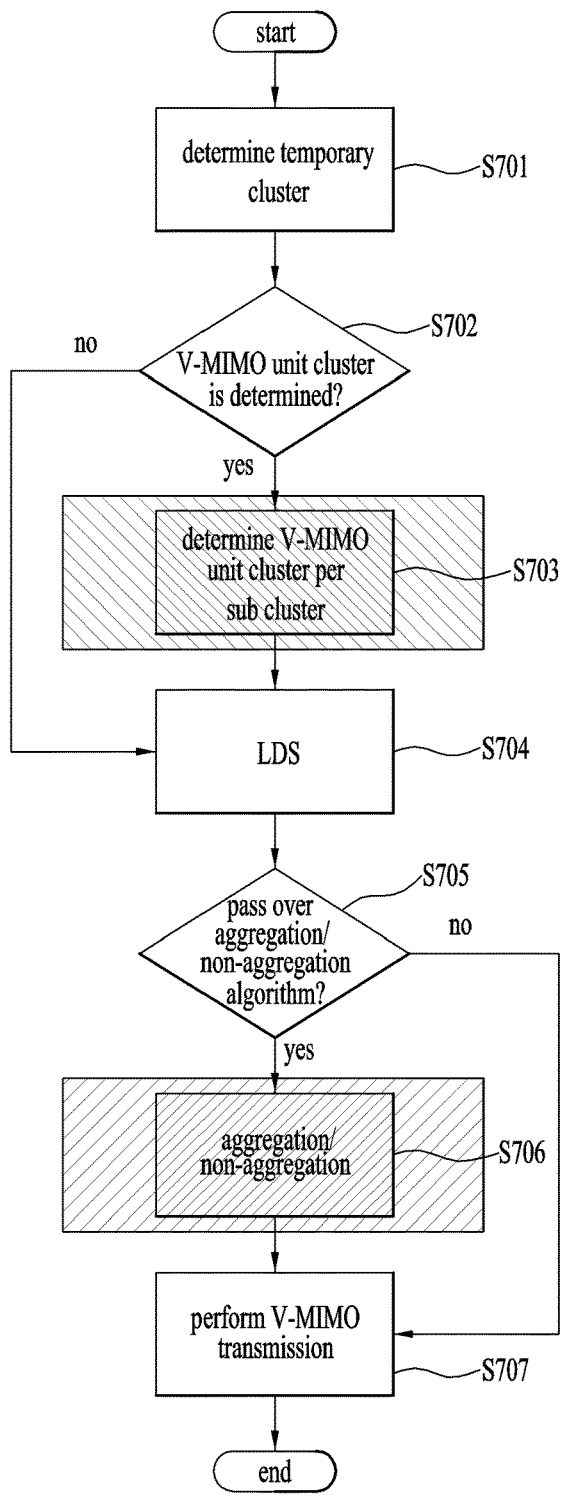
FIG. 7 is a flowchart for a V-MIMO scheme of a hierarchical cooperative structure according to the present invention.

FIG. 7 is a flowchart for a V-MIMO scheme of a hierarchical cooperative structure according to the present invention. Referring to FIG. 7, a temporary cluster is determined [S701] and whether to determine a V-MIMO unit cluster is determined in the determined temporary cluster [S702]. If it is determined to determine the V-MIMO unit cluster, V-MIMO unit cluster per each temporary (sub) cluster is determined [S703]. Subsequently, LDS is performed in each V-MIMO unit cluster [S704]. When unit clusters are aggregated with each other, whether or not the unit clusters pass an aggregation/non-aggregation algorithm is determined [S705]. If the unit clusters pass the aggregation/non-aggregation algorithm, the unit clusters are aggregated with each other [S706] and V-MIMO transmission is performed in an aggregated V-MIMO cluster unit [S707].

It is not mandatory to implement the description mentioned earlier in FIG. 6 and FIG. 7 as a whole. For example, although determining a V-MIMO unit cluster and determining aggregation/non-aggregation are able to be performed at the same time, unlike the examples shown in FIG. 6 and FIG. 7, it can be individually implemented as well. Specifically, V-MIMO transmission can be performed in a V-MIMO unit cluster, which is determined by determining a V-MIMO unit cluster without determining whether to aggregate unit clusters with each other.

In the following, each step of the V-MIMO scheme of the hierarchical cooperative structure schematically mentioned earlier in FIG. 6 and FIG. 7 is explained in detail.

Determination of V-MIMO Unit Cluster

A V-MIMO unit cluster corresponds to a set of nodes participating in actually performing V-MIMO transmission among temporary clusters. The V-MIMO unit cluster defines a ratio of a transfer rate obtained by performing V-MIMO to an amount of resources (e.g., an amount of resources necessary for LDS) used for V-MIMO by a new metric and may be then able to greedily determine a V-MIMO unit cluster based on the new metric.

A method of determining a V-MIMO unit cluster is explained in more detail in the following. One or more entry candidate nodes included in a temporary cluster are selected and transmission efficiency according to the entrance of the entry candidate nodes can be determined. It may include the step of determining whether or not the entry candidate nodes enter a V-MIMO unit cluster based on the determined transmission efficiency. In this case, whether or not the entry candidate nodes enter a V-MIMO unit cluster can be determined by comparing the determined transmission efficiency with transmission efficiency of the entry candidate nodes prior to the entry. A temporary cluster can be determined according to the following description. Transmission efficiency according to the entry of the entry candidate nodes can be determined based on a channel use amount of a cluster including the one or more entry candidate nodes and a transfer rate at the time of performing V-MIMO transmission.

Transmission efficiency is determined by Equation 11 shown in the following.

$$\frac{R(M)}{\beta_{LDS}(M)} \qquad \text{[Equation 11]}$$

In this case, R(M) corresponds to a transfer rate of a (temporary) cluster M at the time of performing V-MIMO transmission and $\beta_{LDS}(M)$ corresponds to a channel use amount of the cluster M (at the time of performing LDS).

The $\beta_{LDS}(M)$ is determined by Equation 12 in the following.

$$\beta_{LDS}(M) = \sum_{\forall i \in M} \beta_{LDS}(M(l)) \qquad \text{[Equation 12]}$$

$$\beta_{LDS}(M(l)) = \max_{\forall l,k \in M, l \neq k} \frac{T_l}{\log_2\left(1 + \frac{\eta_{lk}|g_{lk}^2|P_{TX}}{\sigma^2 + \hat{p}^l(M)}\right)}$$

In this case, $\eta_{lk}$ corresponds to a long term channel gain, $g_{lk}$ corresponds to a small scale fading value between an $l^{th}$ transmission node and a $k^{th}$ transmission node, $n_i$ corresponds to a noise signal including $\sigma^2$ power, $T_l$ corresponds to an amount of data transmitted by the $l^{th}$ transmission node, $\hat{p}^l(M)$ corresponds to an average interference amount received by the cluster M from a random neighboring node set, and TX corresponds to transmit power.

Or, transmission efficiency E(M) can be determined by Equation 13 in the following.

$$\beta_{LDS}(M(i)) = \max_{\substack{\forall i,j \in M \\ i \neq j}} \left( \frac{T_i}{\log_2\left(1 + \frac{\rho_{ij}|e_{ij}|}{\sigma^2 + I}\right)} \right) \qquad \text{[Equation 13]}$$

In this case, $T_i$ corresponds to an amount of data transmitted by an $i^{th}$ transmission node and $\beta_{LDS}(M(i))$ corresponds to a channel use amount used by the $i^{th}$ transmission node to exchange data of the $i^{th}$ transmission node. When a transmission node transmits data to a node farthest from the transmission node for data sharing in a cluster, channel use amount become largest. Hence, it may determine as (8). I corresponds to interference power at the time of performing LDS. In the foregoing description, R(M) corresponds to a transfer rate capable of being obtained by V-MIMO transmission performed by the temporary cluster M. As mentioned in the following description, the R(M) may vary according to a type of feedback channel information. $\beta_{LDS}(M)$ corresponds to a channel use amount at the time of performing LDS.

Transmission efficiency can also be determined by Equation 14 or Equation 15 in the following.

$$E(M) = -\left( \frac{\sum_i T_i}{R(M)} + \beta_{LDS}(M) \right) \qquad \text{[Equation 14]}$$

$$E(M) = \frac{1}{\frac{\sum_i T_i}{R(M)} + \beta_{LDS}(M)} \qquad \text{[Equation 15]}$$

In Equation 14, a first item in a parenthesis in the right hand side indicates a time resource necessary for performing V-MIMO transmission and a second item indicates a time resource used for performing LSD. As the first item is getting smaller, V-MIMO can obtain a bigger gain. Since data transmission is not actually performed in the second item, it may be preferable to minimize the second item as well. Hence, maximizing a negative number of the right hand side of Equation 14 or a reciprocal number of the negative number can be used as a metric for determining a V-MIMO cluster.

Determination of transmission efficiency may be non-limited by the aforementioned equations. In particular, an important thing is to define such a metric as transmission efficiency by considering both a part of estimating an anticipated transfer rate using channel information fed back (or obtained by using channel reciprocity) between clusters when V-MIMO transmission is performed and a resource which is lost due to LSD. In particular, any metric for maximizing an anticipated transfer rate at the time of performing V-MIMO transmission and minimizing resource loss due to LSD can be included in the scope of the present invention.

Figure 8:
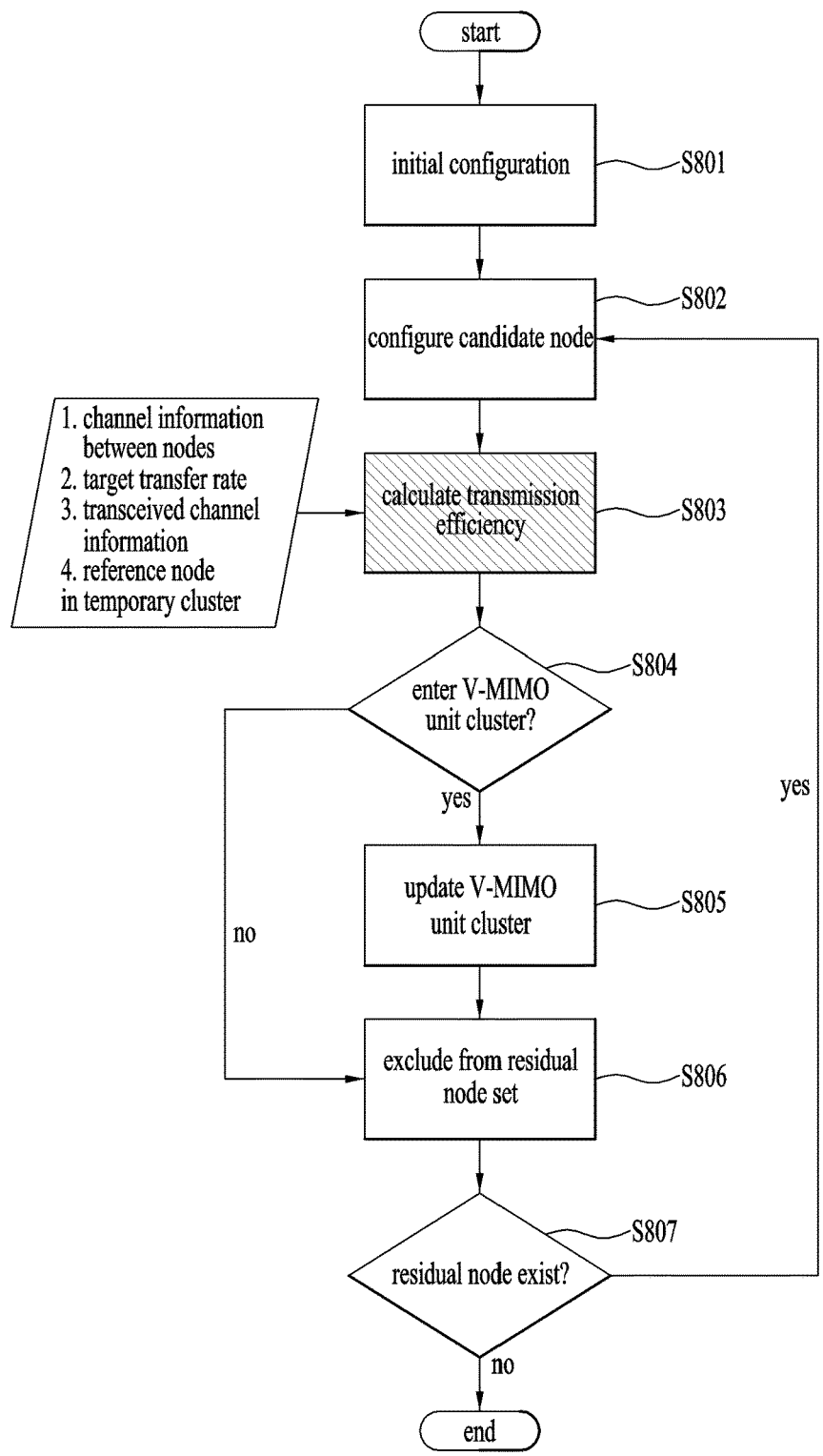
FIG. 8 is a flowchart for a method of determining a V-MIMO unit cluster.

FIG. 8 is a flowchart for a method of determining a V-MIMO unit cluster. Each step is explained in detail with reference to FIG. 8.

The step S801 corresponds to an initial configuration step. An initial $i^{th}$ temporary cluster set may be determined as $(T_i)$. An initial V-MIMO unit cluster set can be determined as $(V_i^{[0]}=$ a representative node ID) and a representative node belongs to the initial V-MIMO unit cluster set. An initial V-MIMO unit cluster residual node set can be determined as ($R_i^{[0]}$) and the initial V-MIMO unit cluster residual node set corresponds to a set of the remaining nodes that the V-MIMO unit cluster set ($V_i^{[0]}$) is excluded from a temporary cluster set ($M_i$). And, a unit cluster entry candidate set corresponds to ($L_i^{[0]} = \emptyset$). And, an intersection element does not exist between sets. In particular, there exists such a relationship as $M_i = L_i^{[0]} \cup R_i^{[0]} \cup V_i^{[0]}$, ($\emptyset = L_i^{[0]} \cap R_i^{[0]} \cap V_i^{[0]}$). At the time of initial configuration, each of nodes shares a mutual ID with each other in a temporary cluster and may be aware of a reference node. In this case, as an extreme example, an element of the temporary cluster may correspond to a single terminal in an initial state.

In the step S802, an entry candidate node can be configured. For example, an entry candidate node or a candidate set ($L_i^{[q]}$) can determine a node or a plurality of nodes in the residual node set ($R_i^{[q]}$) in the $q^{th}$ repeated process ($L_i^{[q]} \subset R_i^{[q]}$). In this case, the entry candidate node can be determined on the basis of an ID order or may use a value mentioned in the appendix A. When only a representative node knows entry candidate reference information according to 'appendix A' described in the following, the representative node can broadcast an entry candidate node. Or, if information is shared by all nodes belonging to a cluster, an entry candidate node can be configured without any broadcasting.

In the step S803, transmission efficiency can be calculated. In this case, two calculations should be performed for the transmission efficiency. One is to calculate transmission efficiency using Equation 16 by assuming a current V-MIMO unit cluster set ($V_i^{[q]}$). Another one is to calculate transmission efficiency (using Equation 17) under an assumption that V-MIMO transmission is performed by a union of an entry candidate node set and a V-MIMO unit cluster set ($V_i^{[q]}$).

$$\frac{R(V_i^{[q]})}{\beta_{LDS}(V_i^{[q]})} \qquad \text{[Equation 16]}$$

$$\frac{R(V_i^{[q]} \cup L_i^{[q]})}{\beta_{LDS}(V_i^{[q]} \cup L_i^{[q]})} \qquad \text{[Equation 17]}$$

In this case, a channel use amount can be obtained based on 'appendix D' described in the following and a transfer rate can be obtained based on 'appendix F' described in the following. As mentioned in the foregoing description, any metric for maximizing an anticipated transfer rate at the time of performing V-MIMO transmission and minimizing resource loss due to LDS can be included in the scope of the present invention. Hence, the idea of the present invention may be non-limited by the transmission efficiency metric such as Equation 16 and Equation 17.

If a channel use value obtained by each node is delivered to a representative node or the channel use value is broadcasted to other nodes belonging to a cluster, the representative node or other nodes can determine whether or not a newly entering node is able to improve transmission efficiency through the aforementioned calculation. Representative nodes calculate a transfer rate using channel information transmitted and received by entry candidate nodes and may proceed to a next step. If the channel use value is broadcasted to all nodes belonging to a temporary cluster, calculation calculated by the representative node can also be performed by all nodes belonging to the temporary cluster at the same time.

In the step S804, it is able to determine whether to aggregate V-MIMO clusters with each other. In the step S805, it is able to update a V-MIMO unit cluster.

In particular, the representative node or all nodes belonging to the temporary/sub cluster can update a V-MIMO unit cluster set using Equation 18 in the following.

$$\max\left\{\frac{R(V_i^{[q]})}{\beta_{LDS}(V_i^{[q]})}, \frac{R(V_i^{[q]} \cup L_i^{[q]})}{\beta_{LDS}(V_i^{[q]} \cup L_i^{[q]})}\right\} = \qquad \text{[Equation 18]}$$

$$\text{if } \begin{cases} \frac{R(V_i^{[q]})}{\beta_{LDS}(V_i^{[q]})}, & V_i^{[q+1]} = V_i^{[q]} \\ \frac{R(V_i^{[q]} \cup L_i^{[q]})}{\beta_{LDS}(V_i^{[q]} \cup L_i^{[q]})}, & V_i^{[q+1]} = V_i^{[q]} \cup L_i^{[q]} \end{cases}$$

If the representative node performs calculation only, a representative node of the sub cluster broadcasts information on whether to aggregate V-MIMO clusters with each other to other nodes according to a value of Equation 18. For example, if the value of Equation 18 is determined by a first item, 1 is broadcasted. Otherwise, 0 is broadcasted. And, a set of residual nodes is updated by $R_i^{[q+1]} = R_i^{[q]} - L_i^{[q]}$.

Subsequently, whether or not there exists a residual node and whether to perform repetition are determined. If a set of residual nodes corresponds to a null set, repetition is stopped. If the set of residual nodes is not a null set, it may return to the step of determining an entry candidate and repeat. If a representative node performs an algorithm calculation only, a representative node finishing the repetition broadcasts an algorithm end signal to other nodes belong to the sub cluster.

Figure 9:
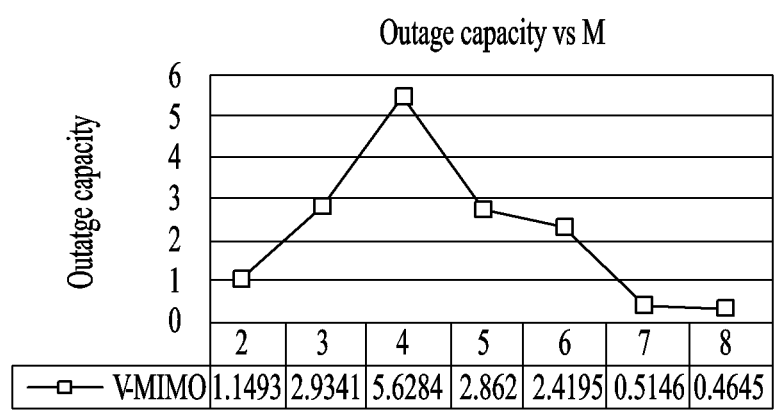
FIG. 9 is a diagram for a V-MIMO unit cluster and a transfer rate.

As mentioned in the foregoing description, if a V-MIMO unit cluster is determined, although the number of nodes participating in the V-MIMO unit cluster is increasing, decrease of effective transmission rate, which is decreased due to the increase of a channel use amount for LDS, can be prevented. As shown in FIG. 9, if a cluster size increases, LDS increases as well and it may have a result of offsetting a gain obtained by performing V-MIMO. If the aforementioned method of determining the V-MIMO unit cluster is used, it is able to obtain an optimized cluster size.

Determination of Temporary Cluster

The aforementioned temporary cluster can be configured by nodes highly probable in obtaining a gain through cooperation due to a close distance. Sets (T, R) of the nodes capable of cooperating with each other due to the close distance are defined. In this case, the T corresponds to a set of nodes belonging to a cluster and the R corresponds to a set of nodes not belonging to the cluster.

When a random reference node makes a request for configuring a temporary cluster, the random reference node can inform a different node of the request by transmitting a cluster configuration reference signal to the different node at the promised time. In this case, the reference node may correspond to various types. For example, the reference node may correspond to a node intending to increase transmission efficiency via V-MIMO since transmission efficiency of transmission performed between single transmission and reception nodes is lower than a preferred target transmission rate. Or, the reference node may correspond to a randomly selected node. Or, the reference node may correspond to a specific node, which has recognized that a plurality of nodes exist in the vicinity of the specific node (e.g., the specific node can recognize that nodes more than the prescribed number exist near the specific node through D2D discovery).

Having received the temporary cluster configuration reference signal, other nodes measure reception SNR (or RSRP) and deliver a signal participating in a temporary cluster together with IDs of other nodes to other nodes in response to a reception signal exceeding a prescribed reference. In this case, an ID of a node, which has transmitted the cluster configuration reference signal, can be transmitted together. This is because the reference signal can be transmitted by a plurality of nodes. In this case, when V-MIMO is configured, if a node too far from a cluster comes into the cluster, channel use increases in the course of exchanging data between nodes, thereby decreasing transmission efficiency. This is the reason why an SNR reference is configured. In particular, the SNR reference can be configured to improve transmission efficiency.

After the participating nodes emit a participating signal during a predetermined prescribed duration, configuration of the temporary cluster can be terminated. Consequently, the nodes belonging to the temporary cluster become aware of a mutual ID and the number of nodes participating in the temporary cluster.

There may exist a plurality of temporary cluster configuration reference nodes at the same time. In this case, it may be able to configure a plurality of temporary clusters on the basis of each of a plurality of the reference nodes. Or, it may configure V-MIMO using a single cluster by determining a condition among a plurality of the configuration reference nodes. For example, when SNR is measured via a reference signal, if a distance between reference nodes is greater than a prescribed value (i.e., if a distance is short), a single reference node or partial reference nodes are remained as a reference node among a plurality of reference nodes and the remaining reference nodes are included in a different temporary cluster. Or, if transmission is essential, it may consider a case of including the remaining reference nodes in a V-MIMO unit cluster all the time by assigning transmission priority to the nodes.

All nodes except a reference node emit a temporary cluster participation intention signal to a node of which SNR of the node is greater than reference SNR and a configuration reference signal is greatest. A single node may participate in a plurality of temporary clusters. In this case, SNR of a reference signal received from a reference node is greater than a reference value. The single node can inform a plurality of a plurality of reference nodes of participation intention of the single node in an order of a size.

A temporary cluster can be determined in advance using the aforementioned example or any other method. In particular, all nodes belonging to a temporary cluster know IDs of other nodes participating in the temporary cluster and the number of the nodes. And, the nodes belonging to the temporary cluster also know a representative node of the temporary cluster.

Meanwhile, as an extreme case, a size of a temporary cluster may correspond to a single node. In particular, a V-MIMO clustering process can be performed by immediately entering a next stage without a temporary clustering. Since it is able to clearly anticipate a gain via V-MIMO transmission between very close UEs, the temporary clustering is performed to reduce additional signaling overhead by performing clustering on the UEs in advance.

In the present invention, if a temporary cluster is configured by a set of UEs close to a specific reference node, the temporary cluster can be immediately used as a V-MIMO cluster. In this case, it may be able to immediately enter a LDS process without passing through a V-MIMO cluster determination algorithm. After the LDS, it may enter a cluster aggregation algorithm.

LDS Step

After V-MIMO unit clusters are determined, LDS is performed in the V-MIMO unit clusters at the same time according to each V-MIMO unit cluster. Or, if a channel use for the LDS is divided according to a cluster, the LDS can be performed without interference. If the LDS is completed according to each V-MIMO unit cluster, each representative broadcasts an end signal to nodes belonging to a different V-MIMO unit cluster and nodes of a V-MIMO unit cluster to which the representative belongs thereto. If a V-MIMO unit cluster configuration algorithm is not used, the LDS step can be performed using 'appendix A, B, C and D' described in the following under an assumption that all nodes belonging to a sub cluster perform transmission.

V-MIMO Unit Cluster Aggregation Step

The V-MIMO unit cluster can be aggregated with a different V-MIMO unit cluster according to transmission efficiency. Whether or not the V-MIMO unit clusters are aggregated with each other can be determined by comparing transmission efficiency of the V-MIMO unit cluster with transmission efficiency at the time of aggregating with the different V-MIMO unit cluster. In particular, whether or not the V-MIMO unit clusters are aggregated with each other can be determined by Equation 19 in the following.

$$\max\left[\frac{R(S^{[q]})}{\beta_{Used}^{[q]}(S^{[q]})}, \frac{R(S^{[q]} \cup L^{[q]})}{\beta_{Used}^{[q]}(S^{[q]}) + \beta_{New}^{[q]}(S^{[q]} \cup L^{[q]})}\right]$$ [Equation 19]

In this case, $R(S^{[q]})$ corresponds to a transfer rate of the V-MIMO unit cluster, $R(S^{[q]} \cup L^{[q]})$ corresponds to a transfer rate at the time of aggregating the V-MIMO unit cluster with the different V-MIMO unit cluster, $\beta_{Used}^{[q]}(S^{[q]})$ corresponds to a channel use amount of a V-MIMO unit cluster, and $\beta_{New}^{[q]}(S^{[q]} \cup L^{[q]})$ corresponds to a channel use amount occurring when V-MIMO unit clusters are aggregated with each other.

If the aggregation/non-aggregation algorithm is not used, a V-MIMO unit cluster can perform sequential V-MIMO transmission using an orthogonal channel.

Figure 10:
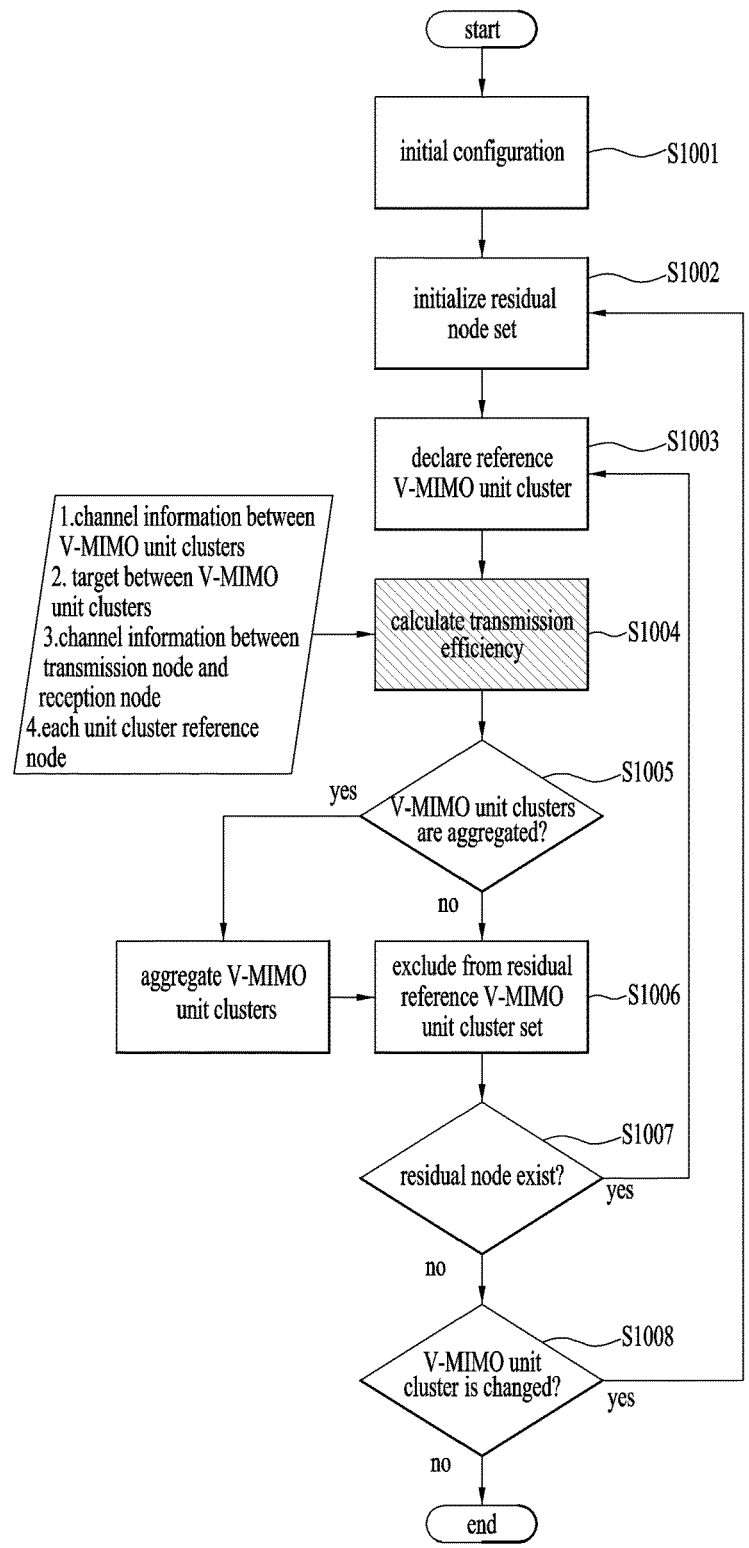
FIG. 10 is a flowchart for an aggregation/non-aggregation algorithm according to the present invention.

FIG. 10 is a flowchart for an aggregation/non-aggregation algorithm according to the present invention. Referring to FIG. 10, an initial configuration (number of V-MIMO unit clusters, number of nodes, sharing a target transmission amount) is performed in the step S1001. All of V-MIMO unit cluster sets are included in a cluster. A V-MIMO unit cluster set can share information on the number of the V-MIMO unit cluster sets participating in the aggregation and the non-aggregation algorithm and the number of nodes belonging to each of the V-MIMO unit cluster sets with a reference node or all nodes belonging to the V-MIMO unit cluster set through 'appendix H'. LSD can be performed between nodes in an identical V-MIMO unit cluster set.

Before an algorithm starts, all representative nodes define 1) a current V-MIMO unit cluster set, 2) a currently used channel use amount, and 3) an average interference amount set. A set of V-MIMO unit clusters is defined as $X^{[0]}=\{V_1, V_2, \ldots, V_K\}$. The set corresponds to a set of V-MIMO unit clusters participating in the aggregation/non-aggregation algorithm of the V-MIMO unit clusters.

A currently used channel use amount of each of the V-MIMO unit clusters is defined as $B_{Used}^{[0]}=\{\beta_{Used}^{[0]}(V_1),$ $\beta_{Used}{}^{[0]}(V_2), \ldots, \beta_{Used}{}^{[0]}(V_K)\}$. This indicates an amount of channels used by a current V-MIMO unit cluster set until a current step.

In order to measure interference between V-MIMO unit clusters, average interference amount can be measured using the aforementioned appendix C. Nodes belonging to a same V-MIMO unit cluster can share average interference amount from a different V-MIMO unit cluster.

$\overline{P}_{Inter}{}^{[0]} = \{\overline{P}_{Inter}{}^{[0]}(V_1), \overline{P}_{Inter}{}^{[0]}(V_2), \ldots, \overline{P}_{Inter}{}^{[0]}(V_K)\}$ In the step S1002, a residual reference unit cluster set is initialized. The residual reference unit cluster set may correspond to the remaining set of a reference unit cluster becoming a reference of aggregation and non-aggregation. A repetition of the algorithm is determined based on the residual reference unit cluster set. At the beginning, the residual reference unit cluster set is defined as $R^{[0]} = \{V_1, V_2, \ldots, V_K\}$. For example, when the algorithm is repeated q times, the residual reference unit cluster set is defined as $R^{[q]} = X^{[q]}$.

A current V-MIMO unit cluster set is declared. When a step of the aggregation/non-aggregation is finished in the step S1005 and the step S1007 of the present algorithm, all nodes can update the current V-MIMO unit cluster set in accordance with a signal indicating a result of the step broadcasted by a reference node.

In the step S1003, it may be able to declare a reference V-MIMO unit cluster and an aggregation target cluster. For example, when the algorithm is repeated q times, a V-MIMO unit cluster set among the residual reference unit cluster sets is declared as the reference V-MIMO unit cluster set and it can be represented as $S^{[q]} = V_i$, $(\exists V_i \in R^{[q]})$. The reference V-MIMO unit cluster can be selected by a random order or a specific reference. For example, the reference V-MIMO unit cluster can be selected from among V-MIMO unit clusters most frequently exchanging interference with each other.

When a reference cluster is determined, an aggregation target cluster to be aggregated with the reference cluster can be determined by $$L^{[q]} = \max_{V_j \in X^{[q]}} [\overline{P}_{Inter}(V_j \to S^{[q]})].$$

Since a representative node of the reference cluster is able to inform a representative node of the aggregation target cluster of the aggregation target cluster and interference information has already been shared with each other, it is able to know the aggregation target cluster using information on a reference node only.

In the step S1004, it is able to calculate transmission efficiency. In particular, transmission efficiency at the time of performing aggregation is calculated. The transmission efficiency is calculated for two cases. Transmission efficiency of a current reference node and transmission efficiency at the time of performing aggregation are calculated, respectively.

When aggregation is not performed, transmission efficiency can be calculated by the aforementioned scheme. Hence, the transmission efficiency can be represented as $$\frac{R(S^{[q]})}{\beta_{USED}^{[q]}(S^{[q]})}.$$

When aggregation is performed, transmission efficiency can be calculated as follows. A transfer rate $(S^{[q]} \cup L^{[q]})$ can be calculated by appendix F and the transmission efficiency at the time of performing aggregation can be represented as $$\frac{R(S^{[q]} \cup L^{[q]})}{\beta_{Used}^{[q]}(S^{[q]}) + \beta_{New}^{[q]}(S^{[q]} \cup L^{[q]})}.$$

In this case, $\beta_{New}^{[q]}(S^{[q]} \cup L^{[q]})$ corresponds to a channel use amount newly occurring when transmission data is exchanged between a reference cluster and an aggregation target cluster and the transmission data is shared by nodes of the reference cluster and the aggregation target cluster in a new aggregation process. The channel use amount can be calculated by appendix I, J and K as $\beta_{New}^{[q]}(S^{[q]} \cup L^{[q]}) = \beta_{Trans}^{[q]}(S^{[q]}, L^{[q]}) + \beta_{Trans}^{[q]}(L^{[q]}, S^{[q]}) + \beta_{HC-LDS}^{[q]}(S^{[q]}) + \beta_{HC-LDS}^{[q]}(L^{[q]})$.

In the step S1005, V-MIMO cluster aggregation and non-aggregation are determined. Subsequently, a process of determining whether or not V-MIMO clusters are aggregated with each other is performed on the basis of transmission efficiency. In particular, a representative node of a corresponding V-MIMO unit cluster broadcasts information on whether or not V-MIMO clusters are aggregated with each other to other nodes according to a value of $$\max\left[\frac{R(S^{[q]})}{\beta_{Used}^{[q]}(S^{[q]})}, \frac{R(S^{[q]} \cup L^{[q]})}{\beta_{Used}^{[q]}(S^{[q]}) + \beta_{New}^{[q]}(S^{[q]} \cup L^{[q]})}\right].$$

For example, if a value of the above equation is determined by a forepart item, the representative node broadcasts 1. Otherwise, the representative node broadcasts 0. Having received an aggregation determination broadcast signal, representative nodes of all V-MIMO unit clusters update as follows.

$S^{[q+1]} = S^{[q]} \cup L^{[q]}$ $X^{[q+1]} = X^{[q]} - L^{[q]}$ $\beta_{Used}^{[0]}(S^{[q]}) = \beta_{Used}^{[q]}(S^{[q]}) + \beta_{New}^{[q]}(S^{[q]} \cup L^{[q]})$, $B_{Used}^{[q+1]} = B_{Used}^{[q]} - \beta_{Used}^{[q]}(L^{[q]})$ $\overline{P}_{Inter}^{[q+1]}(S^{[q+1]}) = \frac{\overline{P}_{Inter}^{[q]}(L^{[q]}) + \overline{P}_{Inter}^{[q]}(S^{[q]})}{2}$ $\overline{P}_{Inter}^{[q+1]} = \overline{P}_{Inter}^{[q]} - \overline{P}_{Inter}^{[q]}(L^{[q]})$ If non-aggregation is determined, information of a previous step is used in a manner of changing the step only.

$X^{[q+1]} = X^{[q]}$ $B_{Used}^{[q+1]} = B_{Used}^{[q]}$ $\overline{P}_{Inter}^{[q+1]} = \overline{P}_{Inter}^{[q]}$ In the step S1006, it is able to update a residual reference V-MIMO unit cluster set. Subsequently, if aggregation or non-aggregation is determined, a reference V-MIMO unit cluster is excluded from the residual reference V-MIMO unit cluster set. This can be represented as follows. $R^{[q+1]} = R^{[q]} - S^{[q]}$ In the step S1007, whether or not the residual reference V-MIMO unit cluster set exists is determined. It may check whether or not an element exists in the residual reference V-MIMO unit cluster set. If an element exists in the residual reference V-MIMO unit cluster set, it may return to the step S1003. If the residual reference V-MIMO unit cluster set corresponds to a null set, it may proceed to a next step. This can be represented as follows.

$$\text{if } \begin{cases} R^{[q+1]} = \emptyset, & \text{go back to the iteration step} \\ R^{[q+1]} \neq \emptyset, & \text{to the next step} \end{cases}$$

Similarly, a representative node may be able to broadcast a signal indicating a result according to the two steps.

In the step S1008, it is able to determine whether or not a V-MIMO unit cluster set is changed and the end of the algorithm. If there is no change between a V-MIMO unit cluster set of a previous step and a V-MIMO unit cluster set of a current step, the algorithm is terminated. If there is a change, it may return to the step S1002 and repeat the algorithm.

$$\text{if } \begin{cases} X^{[q+1]} = X^{[q]}, & \text{algorithm be terminated} \\ X^{[q+1]} \neq X^{[q]}, & \text{go back to the iteration step} \end{cases}$$

Similarly, a representative node of a reference V-MIMO unit cluster can broadcast a result to all nodes.

In the foregoing description, although a main entity, which has broadcasted a result of each step, corresponds to the representative node of the reference V-MIMO unit cluster, if all nodes are able to share information necessary for performing initial configuration with each other, all nodes are able to update sets necessary for the present algorithm according to a result of aggregation/non-aggregation.

V-MIMO Unit Cluster Transmission Step

V-MIMO transmission can be performed after passing through a V-MIMO unit cluster determination algorithm and an aggregation/non-aggregation algorithm. Basically, when the V-MIMO transmission is performed, it may use orthogonal channels (e.g., time division, frequency division, code division, etc.). It may inform a receiving end of a result of a transmission cluster and a representative node or all nodes can transmit a signal to each reception node to indicate which transmission precoder is used. In this case, if the reception node is able to configure a cluster, the reception node is also able to use a method of sharing reception data. All technologies can be replaced with reception cooperation. For example, in case of using a reception post coder instead of configuring a precoder, reception nodes configure a cluster and may be then able to perform the aforementioned result together with a receiver.

Simulation Result

FIGS. 11 to 16 are diagrams for experiment results according to embodiments of the present invention. An experimental condition assumes that each node has maximum 23 dBm transmit power, there is Non Line of Sight (NLOS) channel between a transmission node and a reception node, and a channel between transmission nodes corresponds to Line of Sight (LOS). And, a channel path loss model assumes the following. If a distance is less than 50 m, it may assume 98.45+20 $\log_{10}$(D). In this case, D corresponds to kilometer. If a distance is equal to or greater than 50 m, it may assume 55.78+40 $\log_{10}$(D). In this case, D corresponds to meter. Basically, it is assumed that a distance between a transmission node and a reception node is greatest, a distance between transmission clusters is second greatest, and a distance between nodes in a cluster is shortest. The assumption can be represented as $d_{TX-RX} \gg d_{Inter-cluster} \gg d_{Intra-cluster}$.

Figure 11:
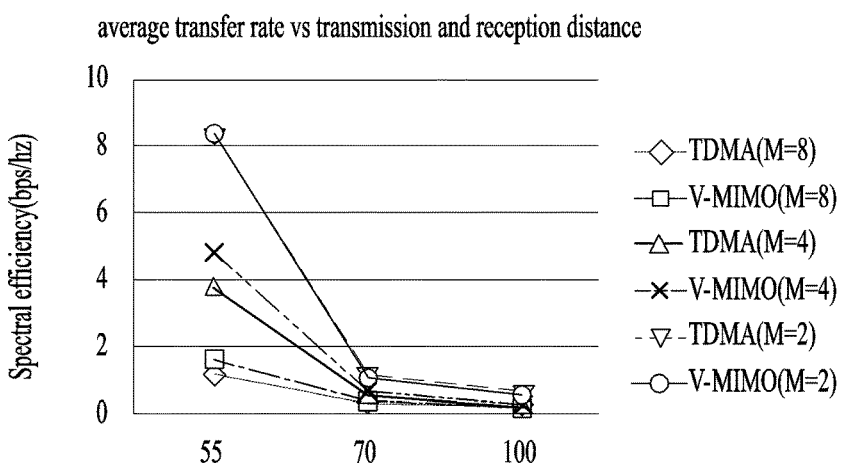
FIGS. 11 to 16 are diagrams for experiment results according to embodiments of the present invention.
Figure 12:
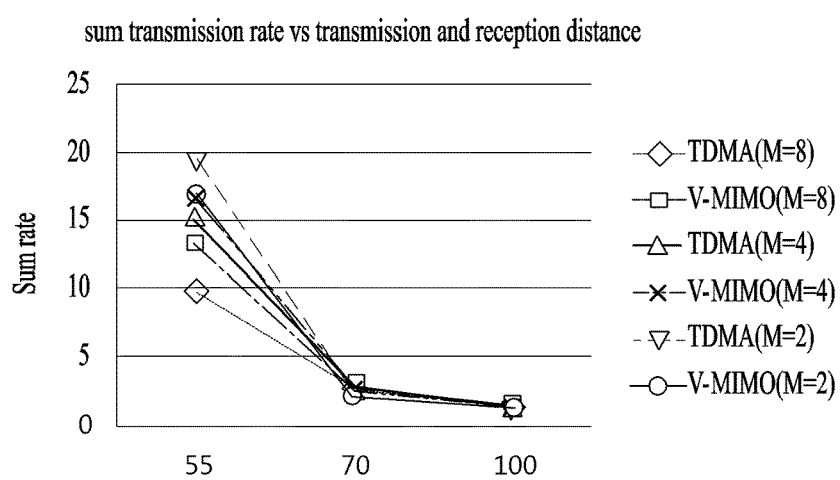

FIG. 11 shows transmission efficiency according to an average distance between a transmission node and a reception node in a single transmission cluster (the transmission cluster is 10 meters in diameter) and a cluster size. FIG. 12 shows a sum transmission rate according to an average distance between a transmission node and a reception node in a single transmission cluster (the transmission cluster is 10 meters in diameter) and a cluster size.

In FIG. 11, assume a case that transmission clusters are gathered within the diameter of 10 meters. Average transmission efficiency per node is shown according to a distance in various cluster sizes. As a distance between a transmission cluster and a reception cluster increases, transmission efficiency decreases. As the number of UEs increases, transmission efficiency per UE decreases. Yet, it is able to check that total transmission efficiency is highest when the number of nodes corresponds to 4. FIG. 12 shows a sum transmission rate in a condition identical to the condition of FIG. 11. A sum transmission rate via V-MIMO is highest when M corresponds to 4. In this case, the sum transmission rate shows 19.498 bps/Hz. As an average distance between a transmission node and a reception node increases, the sum transmission rate tends to decrease. As the distance increases, it is able to check that a transmission rate gain capable of being obtained by cooperation of many nodes increases. On the contrary, as the average distance between the transmission node and the reception node decreases, it is able to check that a sum transmission rate increases through an appropriate cluster size. This is because, since a channel use amount used for LDS increases according to the increase of the number of nodes in a cluster, a factor of degrading transmission efficiency is greater than a gain capable of being obtained by cooperation.

Figure 13:
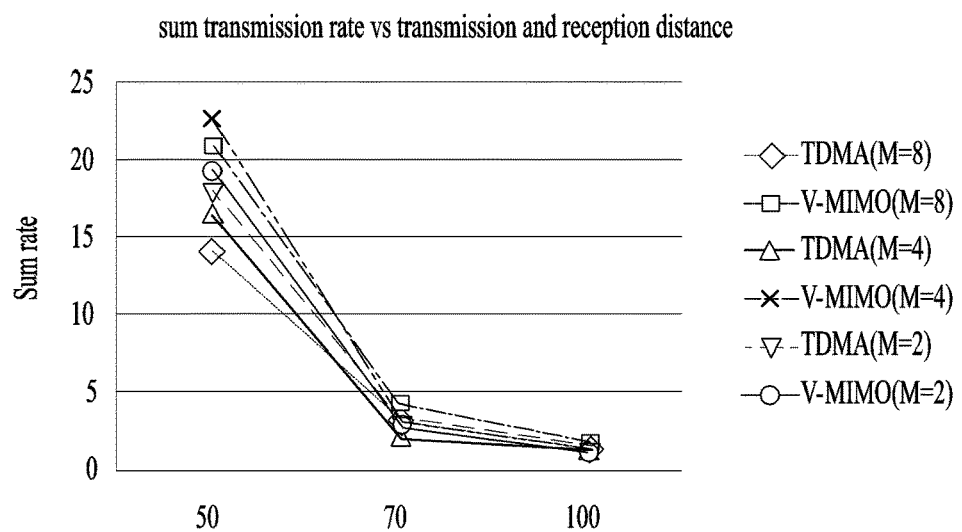
Figure 14:
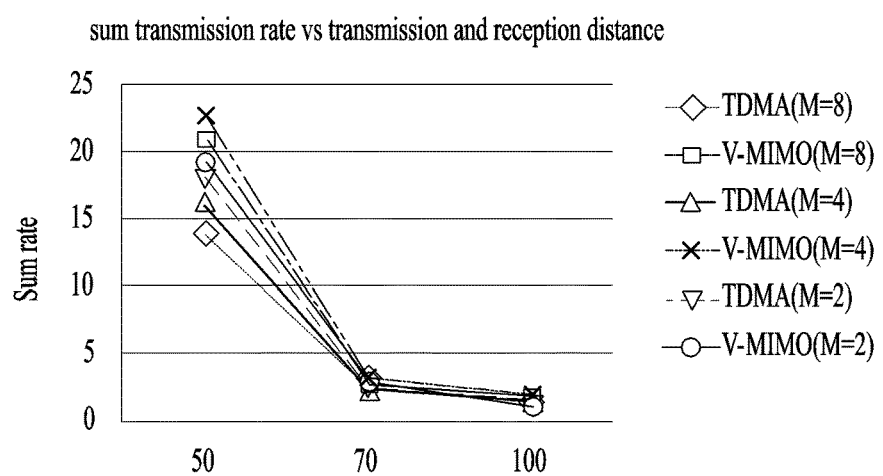

FIG. 13 and FIG. 14 show transmission efficiency per node and a sum transmission rate, respectively, according to a cluster size and an average distance between a transmission cluster and a reception cluster when a transmission sub cluster is 5 meters in diameter. A tendency of a result is similar to the tendency of FIG. 11 and FIG. 12. Yet, it is able to see that the transmission efficiency is improved in all conditions compared to a case of 10 meters. This is because a channel gain is increased due to a shorter distance and a channel use amount for sharing data is reduced in a cluster.

Figure 15:
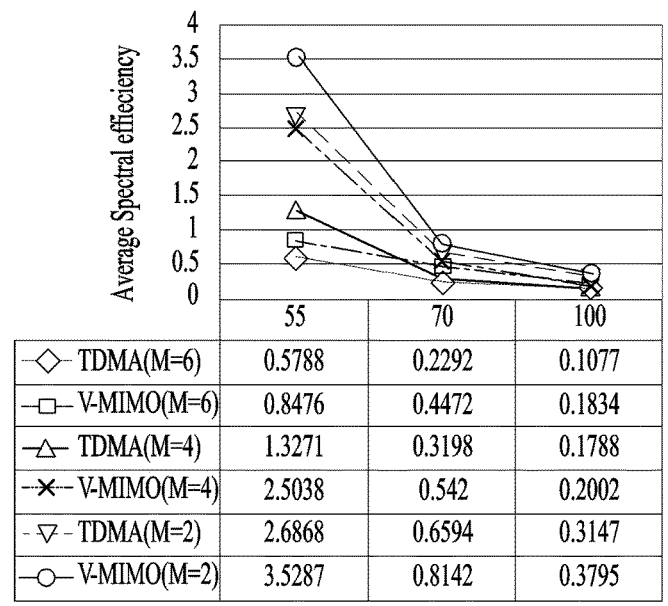
Figure 16:
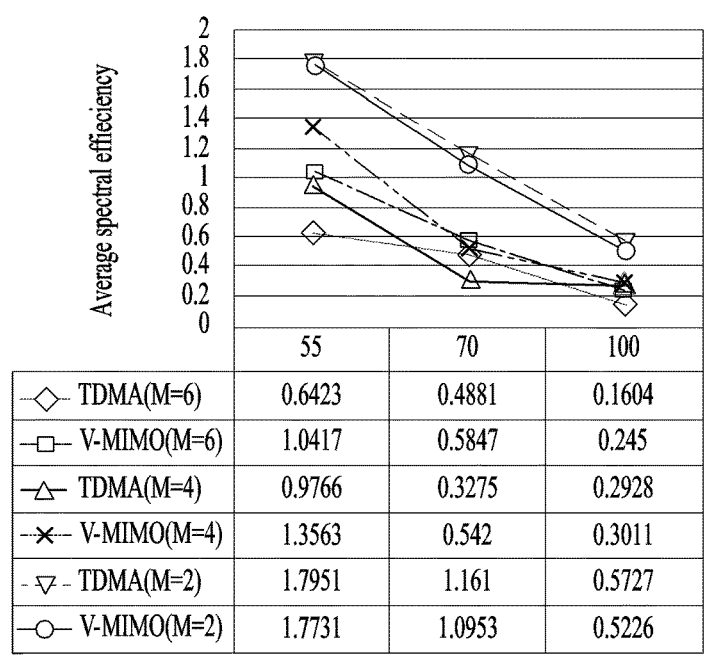

FIG. 15 and FIG. 16 show transmission efficiency per node when multiple transmission sub clusters are configured. The transmission efficiency shows an experimental result when two clusters are configured by a same size. FIG. 14 shows an experimental result when an average distance between transmission sub clusters corresponds to 25 meters and FIG. 15 shows an experimental result when the average distance between transmission sub clusters corresponds to 5 meters. In FIG. 14 and FIG. 15, performance when the average distance between the sub clusters is long and performance when the average distance between the sub clusters is short are compared with each other. If the distance between sub clusters is long, an interference amount of a neighboring sub cluster is small when LDS is performed. If the distance between sub clusters is short, interference is strong when LDS is performed, thereby increasing a channel use amount. Hence, as the channel use amount increases, performance is decreasing. In some cases, transmission efficiency of a V-MIMO ZF transmission scheme can be lower than transmission efficiency of a scheme that each of a transmission node and a reception node sequentially performs TDMA transmission without clustering in a same condition.

APPENDIX

In the following, contents on the aforementioned descriptions described as 'appendix x' are explained.

A. Transmission of Necessary Information after Cluster Configuration

After a temporary cluster configuration is completed, each node broadcasts SNR measurement value, which is measured through a reference signal with a representative node, to a representative node of the temporary cluster and/or all nodes. A size of SNR is proportional to the extent of affecting the representative node. 1) When a V-MIMO unit cluster is determined, as a candidate node configuration reference, it may be able to preferentially configure a node including a big SNR value. 2) A node can broadcast a target transmission rate of the node to other nodes belonging to the temporary cluster. This can also be used as a reference for determining an entry candidate node.

B. Method of Obtaining Channel Information (Channel Between Transmission Nodes in Temporary Cluster)

A channel between nodes in a temporary cluster emits a reference signal, which is promised between the nodes, according to each node (in a sequential order, a predetermined order or a random order) and the remaining nodes in the temporary cluster estimate the channel. If there is a new node intending to enter a V-MIMO cluster, the node emits a reference signal and the rest of nodes listen to the reference signal to estimate a channel from the candidate node. Other nodes in the temporary cluster or a representative node can calculate Equation (11) using the estimated channel.

C. Method of Measuring Average Interference Between Temporary Clusters

If there exist a plurality of clusters, it is necessary to know interference when LDS is performed at the same time. First of all, as mentioned earlier in the first chapter, if a temporary cluster is determined, the number of neighboring temporary clusters and the number of nodes belonging to each of the temporary clusters can be shared. If it is unable to share the number of nodes belonging to each of the temporary clusters, the number of nodes can be replaced with the average number of nodes per temporary cluster.

All nodes belonging to a temporary cluster ($T_i$), which is selected by a random order, emit power with a determined power size $P_{TX}$ and nodes of the remaining temporary clusters ($T_j, \forall j \neq i$) measure interference power ($P_{Inter}(T_j \rightarrow T_i)$). In doing so, it may be able to estimate average interference power ($\overline{P}_{Inter}(T_j \rightarrow T_i)$) of a temporary cluster. It is able to calculate the total average interference power $\overline{P}_{Inter}(T_i)=\text{mean}\{P_{Inter}(T_j \rightarrow T_i)\}$ using the average interference power. When it is unable to measure neighboring interference power although there exist a plurality of temporary clusters, the algorithm can be executed in a manner of considering the average interference power as 0.

In this case, all nodes belonging to a temporary cluster do not emit power but a specific node or a specific node group can emit power only. In this case, having received the power, nodes of a different cluster recognize that all nodes do not emit power and may be then able to estimate average transmit power by scaling or correcting the prescribed number of nodes. For example, when a node knows the number of nodes of a specific temporary cluster and a representative node emits power for estimating average power only, if the node receives the power, the node can estimate average transmit power using a scheme such as 'received power*correction constant'. In this case, it may be necessary to have an assumption that an error should be less by positioning the nodes belonging to the specific cluster at a very close distance. If the nodes belonging to the specific cluster exist at a somewhat distributed location, it may introduce and use a correction constant as a correction value for estimating average transmit power. In this case, when LDS is performed, the correction constant can be used in a manner of generating a specific random number whenever average interference is estimated. Since it is difficult to know an order of actually performing LDS in a different cluster, interference may have a change within a prescribed range on the basis of an average value. In order to reduce a burden of directly signaling the phenomenon and schematically estimate interference, if reception power of a signal emitted by a specific node is changed by generating a random number, it may be able to expect to obtain estimation performance similar to actual estimation performance. Or, the correction constant can be obtained in a manner of deducting the correction constant from average distribution of a temporary cluster. Or, a representative node or a specific node of a specific temporary cluster may induce a correction constant from an average distance or an average SNR and may be then able to broadcast the correction constant to a different cluster.

Meanwhile, when a cluster performs LDS using a TDM scheme, power transmitted by a specific node can be considered as average interference provided when the LDS is performed to a different cluster from the cluster. This is because, when the LDS is performed, if it is assumed that a single UE performs transmission only and a distance between UEs is very close in a cluster, the power transmitted by the specific node is very similar to power transmitted by a different node. When LDS is performed (TDM manner), a representative node emitting power in a cluster to measure average interference may correspond to a specific representative node, a predetermined node, or a randomly selected node.

D. Method of Calculating LDS Channel Use Amount of Random Node Set (A) when V-MIMO Unit Cluster is Determined $\beta_{LDS}(A)$ $$\beta_{LDS}(A) = \sum_{l \in A} \beta_{LDS}(A(l)), \quad \text{(A-1)}$$

$$\beta_{LDS}(A(l)) = \max_{\substack{\forall l, k \in A, \\ l \neq k}} \frac{T_l}{\log_2\left(1 + \frac{\eta_{lk}|g_{lk}|^2 P_{TX}}{\sigma^2 + \overline{P}^l(A)}\right)} \quad \text{(A-2)}$$

In this case, A(l) corresponds to a node l belonging to a node set (A). $\overline{P}^l(A)$ corresponds to average interference amount received from a neighboring random node set and the average interference amount can be obtained by a process such as appendix B. A target transmission rate of the node can be broadcasted to a representative node or all nodes of the A using a method such as the appendix A. In the (A-1) and the (A-2), channel information between nodes belonging to the A can be obtained by a process such as appendix B.

E. Method of Obtaining Channel Information (Channel Between Random Two Clusters or Between Transmission Node and Reception Node)

If a reception node emits a reference signal, a transmission node estimates channel information and may be able to obtain channel information connected with the transmission node. Subsequently, each of the reception node and the transmission node quantizes a channel of its own and the channel is shared in a manner of being broadcasted to a transmission node in a temporary cluster to which each of the transmission node and the reception node belongs thereto using such a method as feedback, a method using channel reciprocity and the like. In particular, if channel change amount is less or complexity and an amount capable of being broadcasted are limitative, a long term channel is broadcasted and shared only among all channels.

If a transmission node emits a reference signal, a reception node estimates channel information, quantizes the channel information and broadcasts the quantized channel information to the transmission node. By doing so, the transmission node can naturally share a channel with the reception node.

F. Method of Calculating Transmission Rate Transmitted from Random Transmission Node Set (A) to Corresponding Reception Node Set In case of receiving short term channel feedback:

$$R_{Short}(A) = \log_2 \det\left(I_{|A|} + \frac{P_{TX}\{H_A G_A\}^H H_A G_A}{\sigma^2}\right) \quad \text{(A-3)}$$

In this case, $G_A$ corresponds to a V-MIMO precoder made from A (In this case, the V-MIMO precoder corresponds to a precoder capable of helping a reception cluster to decode a specific data stream. For example, it may use a ZF precoder or an MMSE precoder as the V-MIMO precoder. Or, it may use a non-linear precoder such as a DPC (dirty paper code) precoder) and $P_{TX}$ corresponds to transmit power. Channel information $H_A$ can be found out by a method such as appendix E.

In case of using long term channel information:

$$R_{Long}(A) = |A|\log_2\left(I + \frac{\mu_{|A|}\overline{\alpha}_A P_{TX}}{\sigma^2}\right) \quad \text{(A-4)}$$

Transmission efficiency is calculated by $\sqrt{\overline{\alpha}_A} \cdot H_A \approx \sqrt{\overline{\alpha}_A} H_A$ approximation. In this case, $\overline{\alpha}_A$ corresponds to an average value of a long term channel gain between a transmission node and a reception node of a group A. A coordination factor $\mu_{|A|}$ corresponds to a value for correcting an error occurred by rate approximation using the long term channel information only. It is able to introduce an approximation coordination factor to reduce an average difference between transmission efficiency resulted from using the long term channel information only and transmission efficiency when precise channels are all known. The coordination factor may correspond to a predetermined value or a value configurable by a feedback between a transmission cluster and a reception cluster. Or, the coordination factor may correspond a value induced based on long term SINR of the transmission cluster or a distance from the reception cluster. As an example, when data are successfully transmitted and received between the transmission cluster and the reception cluster, a signal for gradually increasing the coordination factor can be transceived between the transmission cluster and the reception cluster. In this case, if an SINR margin is equal to or less than a prescribed level in the reception cluster, a signal for stopping the increase of the coordination factor can be transceived between the transmission cluster and the reception cluster.

G. LDS Method (Nodes Belonging to a Random Cluster)

A method of performing LDS in a random node set (A) is descried in the following. A node belonging to a random cluster orthogonally divides resources in accordance with a channel use amount calculated by a method such as appendix D and may be then able to transmit data of the node.

H. Information Exchange Between Multiple Clusters

When multiple temporary clusters exist, assume that a representative node per temporary cluster already knows 1) a size of a temporary cluster to which the representative node belongs thereto, 2) a node ID, and 3) a channel use amount for LDS of the temporary cluster to which the representative node belongs thereto. This can be enabled by appendix A, B, C, D, and the like. Under this assumption, the representative node broadcasts the size of the cluster to which the representative node belongs, IDs of nodes and the channel use amount for LDS to a different cluster to which the representative node does not belong to share the information with the different cluster. And, in order to exchange information between temporary clusters, it is necessary to have a signal for broadcasting a representative node of each temporary cluster. Nodes belonging to each temporary cluster can share a size of a different temporary cluster, node IDs, a channel use amount for LDS and representative nodes through the signal. If a representative node broadcasts interference amount received from a different temporary cluster in a manner of measuring the interference amount using appendix C, the interference amount can be shared with all nodes. While the interference amount is shared between nodes, two temporary clusters affected by the biggest interference amount can be used for determining a reference node of aggregation/non-aggregation algorithm.

I. Calculation of Transfer Rate for Exchanging Data Between Two Random V-MIMO Unit Clusters When data is exchanged between two random V-MIMO unit clusters (A to B) using a precoder, a transfer rate can be defined as follows.

$$R_{Trans}(A, B) = \log_2 \det\left(I_{|B|} + \frac{P_{TX}\{E_{B,A} F_A\}^H E_{B,A} F_A}{\sigma^2}\right) \quad \text{(A-5)}$$

In this case, $F_{A,B} \in \mathbb{C}^{|A| \times min\{|A|,|B|\}}$ corresponds to a V-MIMO precoder made from A (In this case, the V-MIMO precoder corresponds to a precoder capable of helping a reception cluster to decode a specific data stream. For example, it may use a ZF precoder or an MMSE precoder as the V-MIMO precoder. Or, it may use a non-linear precoder such as a DPC (dirty paper code) precoder.). In case of the V-MIMO precoder, a Frobenius norm size of a V-MIMO unit cluster column vector does not exceed transmit power of a node. $P_{TX}$ corresponds to transmit power. The number of data streams is restricted to a small number among $|A|$ and $|B|$.

In case of using a reception post-coder, $$R_{Trans}(A, B) = \log_2 \det\left(I_{|B|} + \frac{P_{TX}\{U_B^H E_{B,A}\}^H U_B^H E_{B,A}}{\sigma^2}\right) \quad \text{(A-6)}$$

In this case, $U_{A,B}{}^H \in \mathbb{C}^{|B| \times min\{|A|,|B|\}}$ corresponds to a V-MIMO post-coder made from A (In this case, the V-MIMO post-coder corresponds to a post-coder capable of helping a reception cluster to decode a specific data stream. For example, it may use a ZF post-coder or an MMSE post-coder as the V-MIMO post-coder. Or, it may use a non-linear post-coder such as a SIC (dirty paper code) post-coder.) In case of the V-MIMO post-coder, a Frobenius norm size of a reception V-MIMO unit cluster column vector does not exceed transmit power of a node.

Similarly, the number of data streams is restricted to a small number among |A| and |B|. Information on two channels ($E_{A,B}$, $E_{B,A}$) can be found out by a method such as appendix E.

J. Calculation of Channel Use Amount for Exchanging Data Between Two Random V-MIMO Unit Clusters When data is exchanged between two random V-MIMO unit clusters (A to B) using a precoder, a channel use amount can be defined as follows.

$$\beta_{Trans}(A, B) = \frac{\sum_{j \in A} T_j}{R_{Trans}(A, B)} \quad (A\text{-}7)$$

K. LDS Channel Use Amount for Hierarchical Cooperative Structure

After data are exchanged between two random V-MIMO unit clusters (A to B), a channel use amount for LDS in a V-MIMO unit cluster can be defined as follows.

$$\beta_{HC\text{-}LDS}(A) = \sum_{l \in A} \beta_{HC\text{-}LDS}(A(l)), \quad (A\text{-}8)$$

$$\beta_{HC\text{-}LDS}(A(l)) = \max_{\substack{\forall l,k \in A, \\ l \neq k}} \frac{Q_l}{\log_2\left(1 + \frac{\eta_{lk}|g_{lk}|^2 P_{TX}}{\sigma^2 + \overline{P}^l(B)}\right)}$$

In this case, $Q_l$ corresponds to a target transfer rate of A(l) for sharing data of a V-MIMO unit cluster B.

L. System Model a. Signal Transceived Between Transmission Node and Reception Node A signal transceived between a random transmission cluster M and a reception cluster via V-MIMO can be represented as follows.

$$y_M = \underbrace{H_M G_M}_{desired} + \underbrace{H_{MN} G_N}_{Interference} + n_M, \quad H_M = \sqrt{\alpha_M} \cdot \overline{H}_M$$

In this case, $G_M \in \mathbb{C}^{|M| \times |M|}$ corresponds to a transmission precoder. In case of the precoder, a Frobenius norm size of a transmission cluster column vector does not exceed transmit power of a node. And, the precoder has the number of data streams not exceeding a size of a small cluster among a size of a transmission cluster and a size of a reception cluster. $G_N \in \mathbb{C}^{|N| \times |N|}$ corresponds to a precoder used by a neighboring different cluster N when transmission is performed. Hence, $H_{MN} G_N$ indicates an interference part.

$\overline{H}_M$ and $\sqrt{\alpha_M} \in \mathbb{C}^{|M| \times |M|}$ respectively correspond to a short term channel and a long term channel between two clusters. (i,j)$^{th}$ element of a channel corresponds to a channel between an i$^{th}$ node of a transmission cluster M and an j$^{th}$ node of a reception cluster. Calculation A·B indicates multiplication of elements of a matrix A and a matrix B. $n_M$ corresponds to a noise signal. A linear reception equalizer $D_M \in \mathbb{C}^{M \times M}$ can be designed in a reception node. The linear reception equalizer is multiplied by $y_M$.

b. Signal Transceived Between Transmission Node and Reception Node Belonging to Identical Cluster Nodes belonging to a same cluster have a single antenna. A reception signal received by an i$^{th}$ reception node from a j$^{th}$ transmission node can be represented as follows.

$$y_i = \sqrt{\eta_{ij}} g_{ij} x_j + n_i$$

In this case, $\sqrt{\beta_{ij}}$ corresponds to a long term channel gain, $g_{ij}$ corresponds to a small scale fading value between the j$^{th}$ transmission node and an i$^{th}$ transmission node, and $n_i$ corresponds to a noise signal of $\sigma^2$ power.

c. Transmission and Reception Equation for Local Data Sharing Between Transmission Clusters A signal transceived between a random transmission cluster M and a different transmission cluster L via V-MIMO can be represented as follows.

$$y_L = E_{L,M} F_{L,M} + E_{L,M} n_M$$

$$E_{L,M} = \sqrt{\rho_{L,M}} \overline{E}_{L,M}$$

In this case, $F_{L,M} \in \mathbb{C}^{|M| \times min\{|L|,|M|\}}$ corresponds to a transmission precoder. In case of the precoder, a Frobenius norm size of a transmission cluster column vector does not exceed transmit power of a node. And, the precoder has the number of data streams not exceeding a size of a small cluster among a size of a transmission cluster and a size of a reception cluster. $\overline{E}_{L,M}$ and $\sqrt{\rho_{L,M}}$ respectively correspond to a short term channel and a long term channel between two clusters. (i,j)$^{th}$ element of a channel corresponds to a channel between an i$^{th}$ node of a transmission cluster M and an j$^{th}$ node of a reception cluster L. $n_L$ corresponds to a noise signal. A linear reception equalizer $U_{L,M} \in \mathbb{C}^{min\{L,M\} \times M}$ can be designed in a reception node. The linear reception equalizer is multiplied by $y_M$.

Configurations of Devices for Embodiments of the Present Invention

Figure 17:
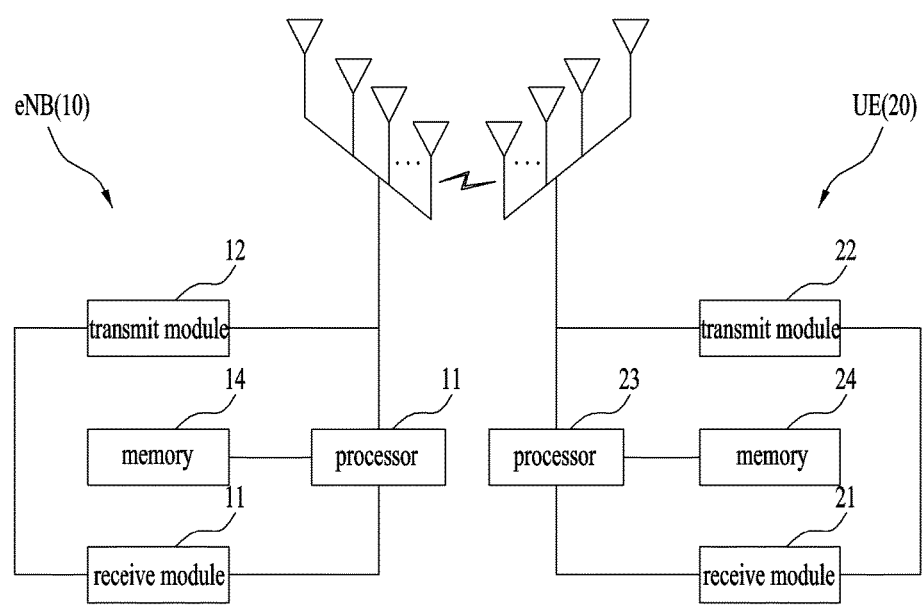
FIG. 17 is a diagram for a configuration of a transceiver.

FIG. 17 is a diagram illustrating configuration of a transmit point apparatus and a UE according to one embodiment of the present invention.

Referring to FIG. 17, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 17, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 8 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of determining, by a network node, a Virtual-Multiple-Input Multiple-Output (V-MIMO) cluster in a wireless communication system, the method comprising:

determining, by the network node, a transmission efficiency of a temporary cluster;

selecting, by the network node, an entry candidate node contained in the temporary cluster;

determining, by the network node, an entry transmission efficiency, wherein the entry transmission efficiency is a transmission efficiency when the entry candidate node enters a V-MIMO unit cluster;

comparing, by the network node, the entry transmission efficiency with a transmission efficiency of the temporary cluster; and determining, by the network node, that the entry candidate node enters the V-MIMO unit cluster if the entry transmission efficiency is greater than the transmission efficiency of the temporary cluster, wherein the transmission efficiency is determined by:

$$\frac{R(M)}{\beta_{LDS}(M)},$$

where $R(M)$ corresponds to a transfer rate of a cluster M at a time of performing V-MIMO transmission and $\beta_{LDS}(M)$ corresponds to a channel use amount of the cluster M.

2. The method of claim 1, wherein $\beta_{LDS}(M)$ is determined by:

$$\beta_{LDS}(M) = \sum_{\forall l \in M} \beta_{LDS}(M(l)), \text{ and}$$

wherein $$\beta_{LDS}(M(l)) = \max_{\forall l,k \in M, l \neq k} \frac{T_l}{\log_2\left(1 + \frac{\eta_{lk}|g_{lk}^2|P_{TX}}{\sigma^2 + \overline{p}^l(M)}\right)},$$

where $\eta_{lk}$ corresponds to a long term channel gain, $g_{lk}$ corresponds to a small scale fading value between an $l^{th}$ transmission node and a $k^{th}$ transmission node, $n_l$ corresponds to a noise signal of $\sigma^2$ power, $T_l$ corresponds to a transmission data amount of the $l^{th}$ transmission node, $\overline{p}^l(M)$ corresponds to an average interference amount received from a neighboring random node set by the cluster M, and $P_{TX}$ corresponds to transmit power.

3. The method of claim 1, wherein the channel use amount corresponds to a resource amount used for local data sharing in a unit cluster.

4. The method of claim 1, wherein if the determination on whether to make the entry candidate node enter the V-MIMO unit cluster is made by a representative node, the determination on whether to make the entry candidate node enter the V-MIMO unit cluster is broadcasted.

5. The method of claim 1, wherein if the entry candidate node is determined to enter the V-MIMO unit cluster, the V-MIMO unit cluster is updated.

6. The method of claim 5, wherein the entry candidate node is excluded from a residual node set of the temporary cluster.

7. The method of claim 6, wherein the determination on whether to make the entry candidate node enter the V-MIMO unit cluster is repeated until there is no node in the residual node set.

8. The method of claim 1, wherein the V-MIMO unit cluster is able to aggregate with a different V-MIMO unit cluster depending on transmission efficiency.

9. The method of claim 8, wherein whether to aggregate the V-MIMO unit cluster with the different V-MIMO unit cluster is determined by comparing transmission efficiency of the V-MIMO unit cluster and transmission efficiency at a time of aggregating with the different V-MIMO unit cluster with each other.

10. The method of claim 1, wherein whether to aggregate the V-MIMO unit cluster with a different V-MIMO unit cluster is determined by:

$$\max\left[\frac{R(S^{[q]})}{\beta_{Used}^{[q]}(S^{[q]})}, \frac{R(S^{[q]} \cup L^{[q]})}{\beta_{Used}^{[q]}(S^{[q]}) + \beta_{New}^{[q]}(S^{[q]} \cup L^{[q]})}\right],$$

where $R(S^{[q]})$ corresponds to a transfer rate of the V-MIMO unit cluster, $R(S^{[q]} \cup L^{[q]})$ corresponds to a transfer rate at the time of aggregating the V-MIMO unit cluster with the different V-MIMO unit cluster, $\beta_{used}^{[q]}(S^{[q]})$ corresponds to a channel use amount of a V-MIMO unit cluster, and $\beta_{New}^{[q]}(S^{[q]} \cup L^{[q]})$ corresponds to a channel use amount occurring at a time of aggregating the V-MIMO unit cluster with the different V-MIMO unit cluster.

11. A network node for determining a Virtual-Multiple-Input Multiple-Output (V-MIMO) cluster in a wireless communication system, the network node comprising:
a radio frequency (RF) unit; and
a processor configured to control the RF unit,
wherein the processor is further configured to:
determine a transmission efficiency of a temporary cluster,
select an entry candidate node contained in the temporary cluster,
determine an entry transmission efficiency, wherein the entry transmission efficiency is a transmission efficiency when the entry candidate node enters a V-MIMO unit cluster,
compare the entry transmission efficiency with a transmission efficiency of the temporary cluster, and
determine that the entry candidate node enters the V-MIMO unit cluster if the entry transmission efficiency is greater than the transmission efficiency of the temporary cluster,
wherein the transmission efficiency is determined by:

$$\frac{R(M)}{\beta_{LDS}(M)},$$

where $R(M)$ corresponds to a transfer rate of a cluster M at a time of performing V-MIMO transmission and $\beta_{LDS}(M)$ corresponds to a channel use amount of the cluster M.

* * * * *